United States Patent
Rudolf

(10) Patent No.: US 12,382,441 B2
(45) Date of Patent: Aug. 5, 2025

(54) UPLINK TRANSMISSION IN FULL-DUPLEX SYSTEMS

(71) Applicant: Samsung Electronics Co., Ltd., Suwon-si (KR)

(72) Inventor: Marian Rudolf, Longueuil (CA)

(73) Assignee: Samsung Electronics Co., Ltd., Suwon-si (KR)

( * ) Notice: Subject to any disclaimer, the term of this patent is extended or adjusted under 35 U.S.C. 154(b) by 414 days.

(21) Appl. No.: 18/062,539

(22) Filed: Dec. 6, 2022

(65) Prior Publication Data

US 2023/0199730 A1    Jun. 22, 2023

Related U.S. Application Data

(60) Provisional application No. 63/291,140, filed on Dec. 17, 2021.

(51) Int. Cl.
*H04W 72/0446* (2023.01)
*H04L 1/00* (2006.01)

(52) U.S. Cl.
CPC ....... *H04W 72/0446* (2013.01); *H04L 1/0003* (2013.01)

(58) Field of Classification Search
CPC .......................... H04W 72/0446; H04L 1/0003
See application file for complete search history.

(56) References Cited

U.S. PATENT DOCUMENTS

| | | | |
|---|---|---|---|
| 2013/0163533 A1* | 6/2013 | Anderson | H04L 1/1812 370/329 |
| 2014/0269453 A1* | 9/2014 | Papasakellariou | H04L 1/1854 370/280 |
| 2016/0211904 A1* | 7/2016 | Kim | H04W 24/08 |
| 2017/0230986 A1* | 8/2017 | Moon | H04W 74/08 |
| 2017/0295593 A1 | 10/2017 | Kim et al. | |
| 2018/0098235 A1* | 4/2018 | Bagheri | H04W 72/20 |
| 2018/0375697 A1* | 12/2018 | Chen | H04L 27/0008 |
| 2019/0075492 A1* | 3/2019 | Suzuki | H04L 5/0044 |
| 2019/0254110 A1* | 8/2019 | He | H04L 41/0896 |

(Continued)

OTHER PUBLICATIONS

"5G; NR; Physical channels and modulation (3GPP TS 38.211 version 17.3.0 Release 17)", ETSI TS 138 211 V17.3.0, Sep. 2022, 141 pages.

(Continued)

*Primary Examiner* — Jael M Ulysse

(57) ABSTRACT

Apparatuses and methods for uplink transmission in full duplex systems. A method for transmitting a physical uplink shared channel (PUSCH) associated with a multi-slot PUSCH transmission procedure includes receiving first information for a first modulation and coding scheme (MCS) indication associated with a first subset of slots from a set of slots on a cell, second information for a second MCS indication associated with a second subset of slots from the set of slots on the cell, and third information for a condition. The method further includes determining whether the condition is valid for transmission in a slot from the second subset of slots and transmitting the PUSCH in a slot associated with the multi-slot PUSCH transmission procedure based on the first MCS indication when the condition is valid and the second MCS indication when the condition is not valid.

20 Claims, 10 Drawing Sheets

(56) References Cited

U.S. PATENT DOCUMENTS

| | | | |
|---|---|---|---|
| 2020/0145168 A1* | 5/2020 | Golitschek Edler von Elbwart | ... H04L 5/0021 |
| 2021/0321434 A1 | 10/2021 | Choi | |
| 2022/0287075 A1* | 9/2022 | Ying | H04L 1/1893 |
| 2023/0308228 A1* | 9/2023 | Alfarhan | H04L 1/1887 |
| 2024/0064764 A1* | 2/2024 | Yamamoto | H04W 72/0446 |

OTHER PUBLICATIONS

"5G; NR; Multiplexing and channel coding (3GPP TS 38.212 version 17.3.0 Release 17)", ETSI TS 138 212 V17.3.0, Sep. 2022, 206 pages.

"5G; NR; Physical layer procedures for control (3GPP TS 38.213 version 17.3.0 Release 17)", ETSI TS 138 213 V17.3.0, Sep. 2022, 262 pages.

"5G; NR; Physical layer procedures for data (3GPP TS 38.214 version 17.3.0 Release 17)", ETSI TS 138 214 V17.3.0, Sep. 2022, 237 pages.

"3rd Generation Partnership Project; Technical Specification Group Radio Access Network; NR; Medium Access Control (MAC) protocol specification (Release 17)", 3GPP TS 38.321 V17.2.0, Sep. 2022, 246 pages.

"3rd Generation Partnership Project; Technical Specification Group Radio Access Network; NR; Radio Resource Control (RRC) protocol specification (Release 17)", 3GPP TS 38.331 V17.2.0, Sep. 2022, 1298 pages.

"5G; NR; Requirements for support of radio resource management (3GPP TS 38.133 version 17.6.0 Release 17)", ETSI TS 138 133 V17.6.0, Sep. 2022, 3348 pages.

International Search Report and Written Opinion issued Mar. 24, 2023 regarding International Application No. PCT/KR2022/020519, 6 pages.

Ericsson, "Remaining Issues for TB Processing over Multi-Slot PUSCH", 3GPP TSGRAN WG1 Meeting #107-e, R1-2112611, Nov. 2021, 17 pages.

* cited by examiner

UPLINK TRANSMISSION IN FULL-DUPLEX SYSTEMS

CROSS-REFERENCE TO RELATED APPLICATION AND CLAIM OF PRIORITY

This application claims priority under 35 U.S.C. § 119(e) to U.S. Provisional Patent Application No. 63/291,140 filed on Dec. 17, 2021. The above-identified provisional patent application is hereby incorporated by reference in its entirety.

TECHNICAL FIELD

The present disclosure relates generally to wireless communication systems and, more specifically, to uplink (UL) transmissions and scheduling operation.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to apparatuses and methods for UL transmission in full duplex systems.

In one embodiment, a method for transmitting a physical uplink shared channel (PUSCH) associated with a multi-slot PUSCH transmission procedure is provided. The method includes receiving first information for a first modulation and coding scheme (MCS) indication associated with a first subset of slots from a set of slots on a cell, second information for a second MCS indication associated with a second subset of slots from the set of slots on the cell, and third information for a condition. The method further includes determining whether the condition is valid for transmission in a slot from the second subset of slots and transmitting the PUSCH in a slot associated with the multi-slot PUSCH transmission procedure based on the first MCS indication when the condition is valid and the second MCS indication when the condition is not valid.

In another embodiment, a user equipment (UE) is provided. The UE includes a transceiver configured to receive first information for a first MCS indication associated with a first subset of slots from a set of slots on a cell, second information for a second MCS indication associated with a second subset of slots from the set of slots on the cell, and third information for a condition. The UE further includes a processor operably coupled with the transceiver. The processor is configured to determine whether the condition is valid for transmission in a slot from the second subset of slots. The transceiver is further configured to transmit the PUSCH in a slot associated with the multi-slot PUSCH transmission procedure based on the first MCS indication when the condition is valid and the second MCS indication when the condition is not valid.

In yet another embodiment, a base station (BS) is provided. The BS includes a transceiver configured to transmit first information for a first MCS indication associated with a first subset of slots from a set of slots on a cell, second information for a second MCS indication associated with a second subset of slots from the set of slots on the cell, and third information for a condition. The BS further includes a processor operably coupled with the transceiver. The processor is configured to determine whether the condition is valid for transmission in a slot from the second subset of slots. The transceiver is further configured to receive the PUSCH in a slot associated with the multi-slot PUSCH transmission procedure based on the first MCS indication when the condition is valid and the second MCS indication when the condition is not valid.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v17.3.0, "NR; Physical channels and modulation" ("REF1"); 3GPP TS 38.212 v17.3.0, "NR; Multiplexing and channel coding" ("REF2"); 3GPP TS 38.213 v17.3.0, "NR; Physical layer procedures for control" ("REF3"); 3GPP TS 38.214 v17.3.0, "NR; Physical layer procedures for data" ("REF4"); 3GPP TS 38.321 v17.2.0, "NR; Medium Access Control (MAC) protocol specification" ("REF5"); 3GPP TS 38.331 v17.2.0, "NR; Radio Resource Control (RRC) protocol specification" ("REF6"); and 3GPP TS 38.133 v17.6.0, "NR; Requirements for support of radio resource management" ("REF7").

The present disclosure relates generally to wireless communication systems and, more specifically, to uplink transmissions and scheduling operation.

Figure 1:
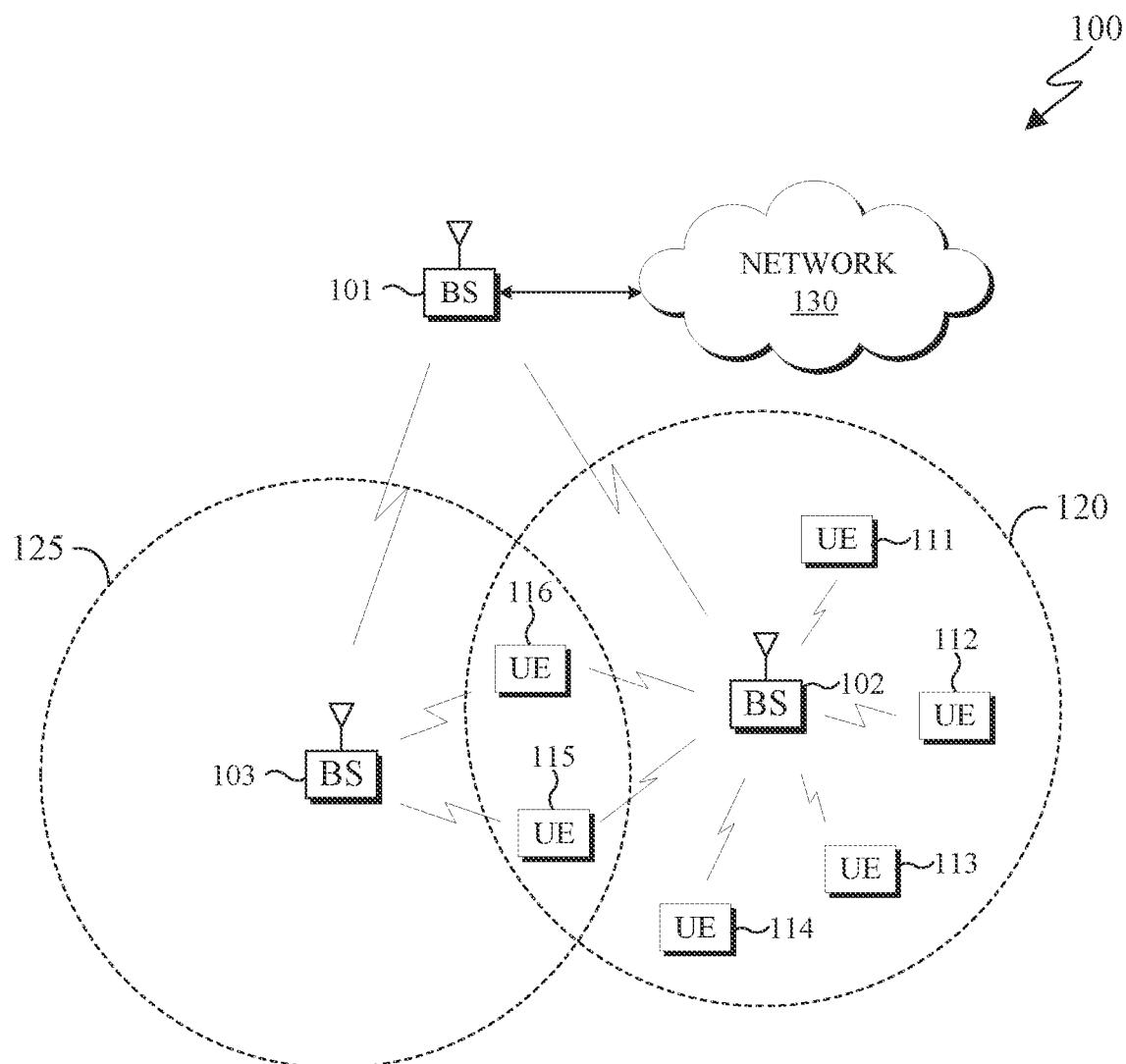
FIG. 1 illustrates an example wireless network according to embodiments of the present disclosure.
Figure 2:
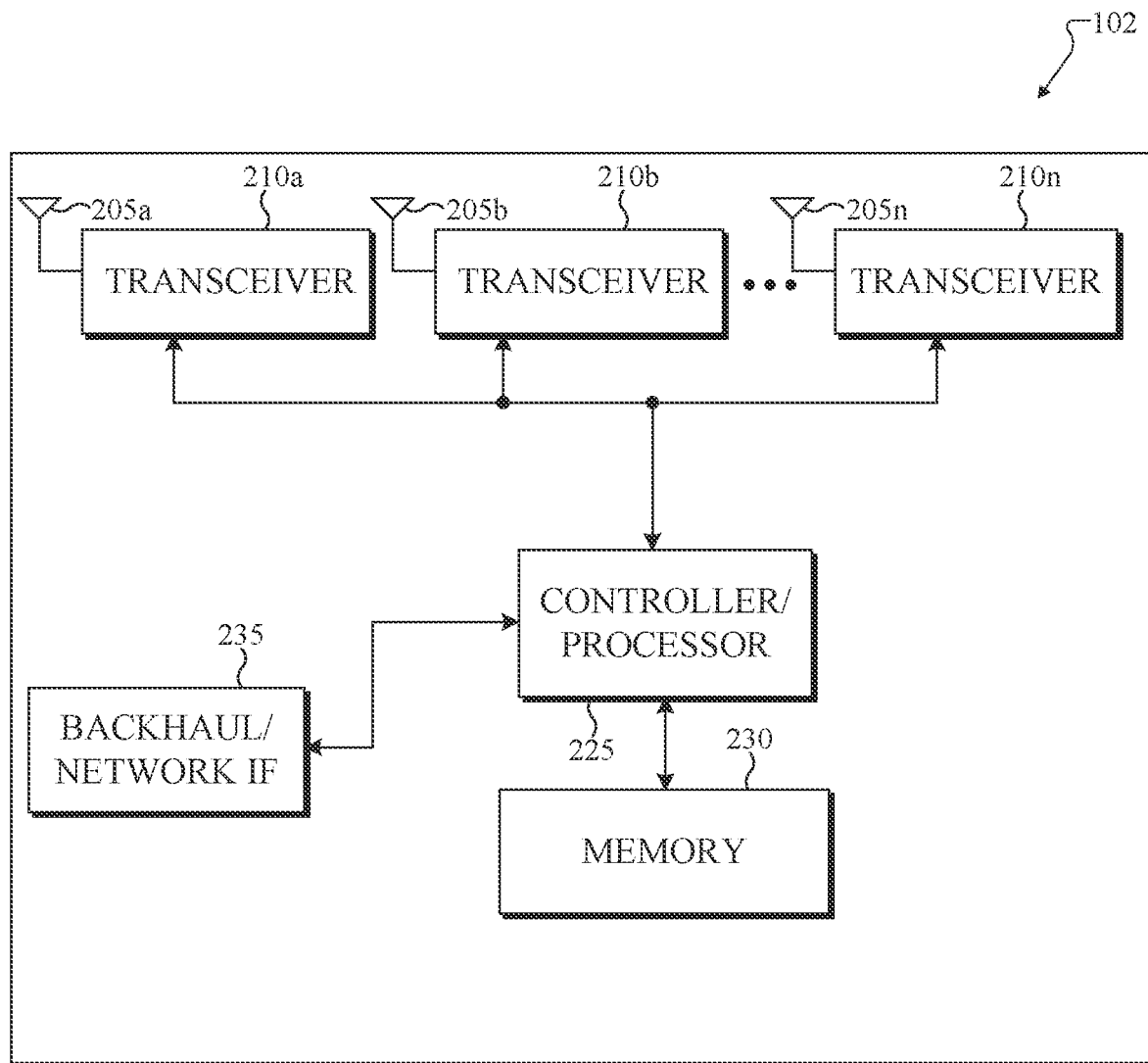
FIG. 2 illustrates an example gNB according to embodiments of the present disclosure.
Figure 3:
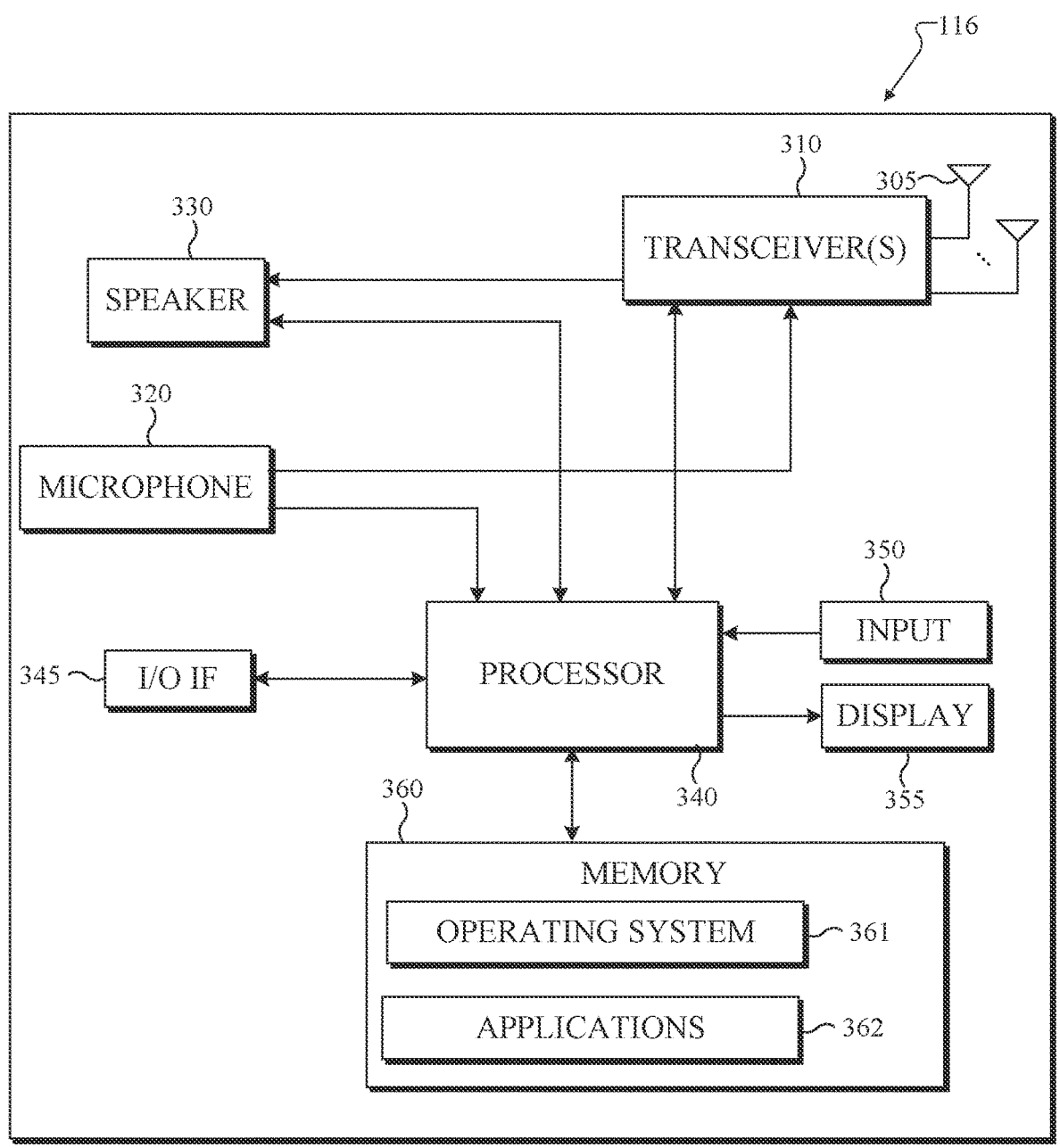
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof for triggering methods for uplink transmission in full duplex systems. In certain embodiments, one or more of the BSs 101-103 include circuitry, programing, or a combination thereof for triggering methods for uplink transmission in full duplex systems.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming radio frequency (RF) signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. As another example, the controller/processor 225 could support methods for uplink transmission in full duplex systems. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna(s) 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
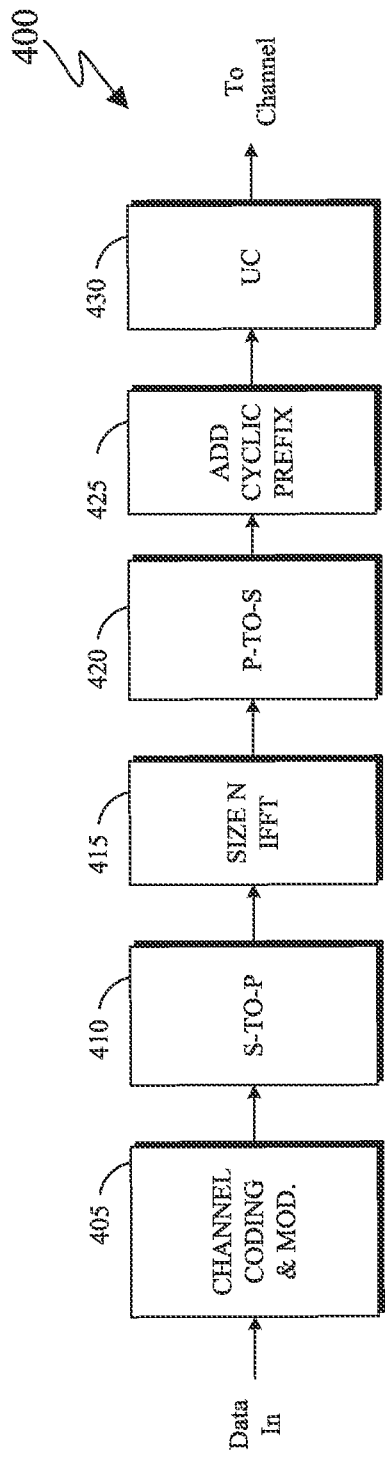
FIGS. 4 and 5 illustrate example wireless transmit and receive paths according to embodiments of the present disclosure.
Figure 5:
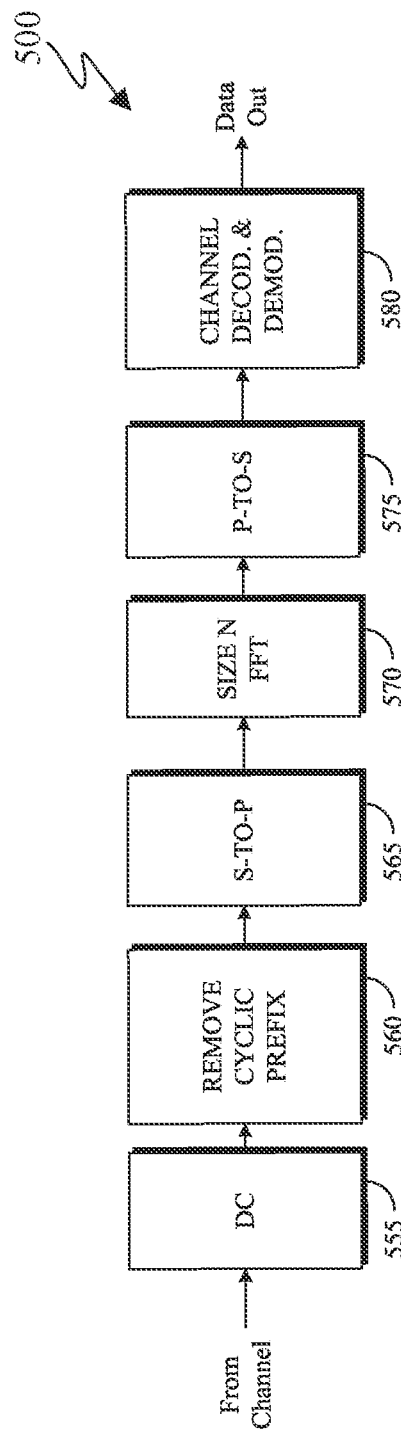

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support triggering methods for timelines for transmissions and receptions in random access as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BSs 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Rel-16 DCI F0_1 can schedule single-TTI or multi-TTI PUSCH allocations by means of the time domain resource assignment (TDRA) field. For multi-TTI PUSCH allocations using DCI F0_1, the RRC parameter pusch-TimeDomainAllocationListForMultiPUSCH is configured. The TDRA field can be up to 6 bits long. The bit width of the TDRA field depends on the number of entries configured in the RRC pusch-TimeDomainAllocationListForMultiPUSCH. Rel-16 allows for multi-TTI PUSCH with up to 8 PUSCHs in consecutive slots. Only the HARQ ID of the 1st PUSCH is signaled explicitly using 4 bits. The HARQ ID of subsequent PUSCHs then increments by +1 (mod 16). For single-TTI PUSCH using DCI F0_1, the RV field is 2 bits and can indicate RVs 0-3. For multi-TTI PUSCH allocations, the RV field is 1 bit per PUSCH. It indicates either RV 0 or 2. The total RV field has length 2-8 bits when DCI F0_1 is used for multi-TTI PUSCH allocations. The NDI is signaled explicitly for each PUSCH in the multi-PUSCH allocation. The NDI field has length 2-8 bits for multi-TTI PUSCH allocations. The single 5-bit MCS field signaled by DCI F0_1 applies to all PUSCHs in the multi-TTI PUSCH allocation. Multi-TTI PUSCH scheduling is not supported by the fallback DCI format F0_0. The Rel-16 multi-TTI PUSCH allocation feature cannot be simultaneously RRC configured together with the Rel-15 PUSCH aggregation feature.

Rel-17 allows for multi-TTI PDSCH allocations using DCI F1_1 and provides additional functionality for multi-TTI PUSCH allocations using DCI F0_1. The Rel-16 principle is preserved that each PDSCH or PUSCH in a multi-TTI allocation is an individual (or separate) TB(s) and that each PDSCH or PUSCH is confined within a slot. The maximum number of PDSCHs or PUSCHs that can be scheduled with a single DCI in Rel-17 is 8. The Rel-16 principle is preserved that the fallback DCI formats F0_0 and F1_0 cannot be used for multi-TTI PDSCH or PUSCH scheduling. When receiving two multi-TTI PDSCH or two multi-TTI PUSCH scheduling DCIs, the UE does not expect that these lead to out-of-order scheduling for the scheduled PDSCHs or PUSCHs.

For a DCI scheduling multiple PDSCHs, HARQ-ACK information corresponding to PDSCHs scheduled by the DCI is multiplexed with a single PUCCH in a slot that is determined based on K1 where K1 is indicated by the PDSCH-to-HARQ_feedback timing indicator field in the DCI or provided by dl-DataToUL-ACK if the PDSCH-to-HARQ_feedback timing indicator field is not present in the DCI indicates the slot offset between the slot of the last PDSCH scheduled by the DCI and the slot carrying the HARQ-ACK information corresponding to the scheduled PDSCHs. For a DCI that can schedule multiple PDSCHs, the MCS field for the 1st TB appears only once in the DCI and applies commonly to the first TB of each PDSCH, the NDI field for the first TB is signaled per PDSCH and applies to the first TB of each PDSCH, the RV field for the first TB is signaled per PDSCH with 2 bits if only a single PDSCH is scheduled or 1 bit for each PDSCH otherwise and applies to the first TB of each PDSCH, the HARQ ID field applies to the first scheduled PDSCH and is incremented by 1 for subsequent PDSCHs with modulo operation, if needed. For a DCI that can schedule multiple PDSCHs, the Priority indicator field is applied to all of scheduled PDSCHs. For a DCI that can schedule multiple PDSCHs, each of VRB-to-PRB mapping, PRB bundling size indicator, ZP-CSI-RS trigger, and rate matching indicator fields appears only once in the DCI. The VRB-to-PRB mapping and PRB bundling size indicator fields are applied to all the PDSCHs scheduled by the DCI. For ZP-CSI-RS trigger field, the triggered aperiodic ZP CSI-RS is applied to all the slot(s) in which the PDSCH(s) scheduled by the DCI are contained. When receiving a PDSCH scheduled by the DCI, the REs corresponding to configured resources in rateMatchPattern-Group1 or rateMatchPatternGroup2 according to indication of rate matching indicator field are not available for the scheduled PDSCH. The UE does not expect to be configured with both of CBG operation and multi-PDSCH scheduling in the same PUCCH cell group with a Type 2 codebook. For a DCI that can schedule multiple PDSCHs, and if RRC parameter configures that two codeword transmission is enabled, the MCS for the 2nd TB appears only once in the DCI and applies commonly to the 2nd TB of each PDSCH, the NDI for the 2nd TB is signaled per PDSCH and applies to the 2nd TB of each PDSCH, the RV for the 2nd TB is signaled per PDSCH, with 2 bits if only a single PDSCH is scheduled or 1 bit for each PDSCH otherwise and applies to the 2nd TB of each PDSCH.

For a DCI that can schedule multiple PDSCHs or PUSCHs in Rel-17, the TDRA table is extended such that each row indicates up to 8 multiple PDSCHs or PUSCHs that can be non-continuous or consecutive in time-domain. The number of scheduled PDSCHs or PUSCHs is implicitly indicated by the number of indicated valid SLIVs in the row of the TDRA table signaled in the DCI. A row of the Rel-17 TDRA table can indicate PDSCHs (or PUSCHs) that are in consecutive or non-consecutive slots by configuring SLIV, mapping type, scheduling offset K0 (or K2) for each PDSCH (or PUSCH) in the row of the TDRA table. For a DCI that can schedule multiple PDSCHs or PUSCHs, the HARQ process number indicated in the DCI is applied to the first valid PDSCH or PUSCH.

If a PDSCH among multiple PDSCHs that are scheduled by a single DCI is collided with UL symbol(s) indicated by tdd-UL-DL-ConfigurationCommon or tdd-UL-DL-ConfigurationDedicated, the UE does not receive the PDSCH. The UE does not expect to be scheduled with multiple PDSCHs by a single DCI, where every PDSCH is in collision with UL symbols. If a PUSCH among multiple PUSCHs that are scheduled by a single DCI is collided with DL symbol(s) indicated by tdd-UL-DL-ConfigurationCommon or tdd-UL-DL-ConfigurationDedicated, the UE does not transmit the PUSCH. The UE does not expect to be scheduled with multiple PUSCHs by a single DCI where every PUSCH is collided with DL symbol(s). If a scheduled PDSCH or PUSCH is dropped due to collision with UL or DL symbol(s) indicated by tdd-UL-DL-ConfigurationCommon or tdd-UL-DL-ConfigurationDedicated, the HARQ process number increment is skipped for the PDSCH or PUSCH and applied only for valid PDSCH(s) or PUSCH(s). For a PDSCH that is scheduled by multi-PDSCH scheduling DCI and is skipped due to collision with semi-static UL symbol(s), for Type-1 HARQ-ACK codebook generation, the PDSCH is not considered and the HARQ-ACK bit corresponding to the PDSCH is not reported by UE and for Type-2 HARQ-ACK codebook generation, the UE reports NACK for the PDSCH.

For multiple PDSCHs or PUSCHs scheduled by a single DCI, the Rel-16 principle is preserved that if one of multiple PDSCHs or PUSCHs scheduled by the DCI collides with a flexible symbol indicated by tdd-UL-DL-Configuration-Common or tdd-UL-DL-ConfigurationDedicated, or if PUSCH is collided with SSB symbols indicated by ssb-PositionsInBurst or symbol(s) indicated by pdcch-ConfigSIB1 in MIB for a CORESET for Type0-PDCCH CSS set, the HARQ process number increment is skipped for the PUSCH. Otherwise, the HARQ process number increment is not skipped for that PDSCH or PUSCH.

For a DCI that can schedule multiple PUSCHs and a CSI request, when the DCI schedules M PUSCHs, the PUSCH that carries the aperiodic CSI feedback is M-th scheduled PUSCH for M<=2, or (M−1)-th scheduled PUSCH for M>2. For a DCI that can schedule multiple PUSCHs, the Priority indicator and open loop power control parameter set indication fields are applied to all of the scheduled PUSCHs.

Note that Rel-16 NR-U introduced multi-TTI PUSCH allocations for the same reasoning as Rel-14 LTE eLAA. The UE can only transmit PUSCH in the UL after successful completion of an LBT based channel procedure. It is more spectrally efficient to let the UE transmit all its UL data, e.g., up to the typically allowed COT duration of 6 or 8 msec's, to minimize the need for multiple DL and UL LBT procedures for transmission of the scheduling DCIs and the PUSCH(s). When operating in shared spectrum such as the 5-6 GHz unlicensed bands, multi-TTI PUSCH allocations must occur in consecutive slots due to regulatory channel occupancy requirements. After the UE wins UL channel access and begins to transmit PUSCH(s), there can't be a transmission gap.

The introduction of multi-PDSCH allocation using a single scheduling DCI and changes to multi-TTI PUSCH allocations in Rel-17 is motivated by a different set of considerations. Scheduling PDSCH or PUSCHs using multi-TTI allocations with a single DCI is beneficial to reduce the DL/UL switching overhead in FR2-2. The number of required switching symbols for data symbols with SCS=480 or 960 kHz is much more penalizing than with SCS=30 kHz in FR1 or SCS=120 kHz in FR2. In addition, multi-TTI PDSCH or PUSCH allocations can reduce PDCCH overhead, can reduce PDCCH monitoring frequency and can improve upon UE power saving. Unlike NR-U, contiguous multi-TTI PDSCH or PUSCH allocations in time cannot always be assumed, because the gNB should still be able to allocate slots to other UEs in-between using dynamic scheduling. Therefore, non-contiguous Rel-17 TDRA tables are introduced to support multi-TTI allocations for PDSCH or PUSCH. Rel-16 NR-U and Rel-17 design assume that channel coherency is maintained during the duration of a multi-TTI PDSCH or PUSCH allocation. Therefore, the same MCS and the same TPC command is employed for all scheduled PDSCH or PUSCHs part of the single DCI multi-TTI PDSCH or PUSCH allocation. If channel coherency time is short, e.g., only in the order of usec's instead of msec's, the gNB can observe the channel properties based on SRS and CSI reports and decide to use or not use the multi-TTI PDSCH or PUSCH allocations or limit these to fewer than the maximum of 8 slots. Rel-17 also preserves the principle that PUSCH aggregation and multi-TTI PUSCH allocations cannot be configured simultaneously. The reason is that PUSCH aggregation is assumed to be a feature for UEs operating in bad link conditions to improve the link robustness. Multi-TTI PUSCH allocations is a feature for UEs operating in medium or good link conditions to make the link operate more efficiently.

5G NR radio supports time-division duplex (TDD) operation and frequency division duplex (FDD) operation. Use of FDD or TDD depends on the NR frequency band and per-country allocations. TDD is required in most bands above 2.5 GHz.

Figure 6:
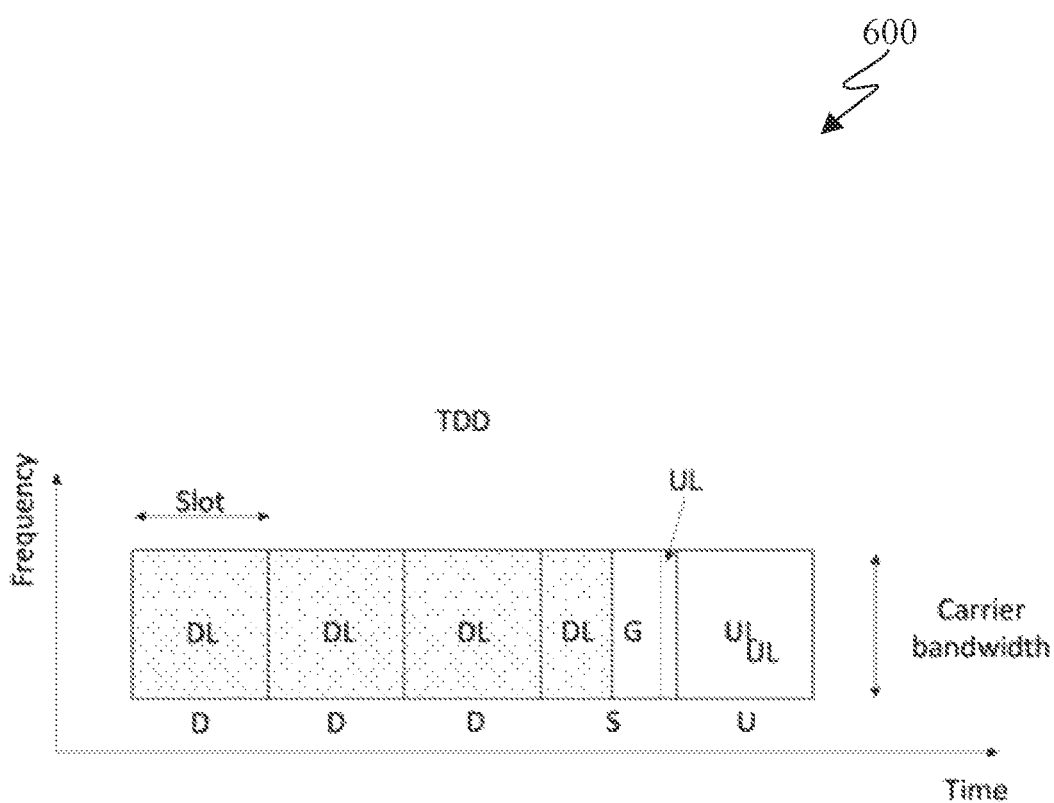
FIG. 6 illustrates an example UL-downlink (DL) frame configuration in a time division duplex (TDD) communications system according to embodiments of the disclosure.

FIG. 6 illustrates an example structure 600 of slots for a TDD communications system according to the embodiments of the disclosure. The embodiment of the example structure 600 of slots for a TDD communications system illustrated in FIG. 6 is for illustration only. FIG. 6 does not limit the scope of this disclosure to any particular implementation of the example structure 600 of slots for a TDD communications system.

As illustrated in FIG. 6, a DDDSU UL-DL configuration is shown, where D denotes a DL slot, U denotes an UL slot, and S denotes a special or switching slot with a DL part, a flexible part that can also be used as guard period G for DL-to-UL switching, and optionally an UL part.

TDD has a number of advantages over FDD. For example, use of the same band for DL and UL transmissions leads to simpler UE implementation with TDD because a duplexer is not required. Another advantage is that time resources can be flexibly assigned to UL and DL considering an asymmetric ratio of traffic in both directions. DL is typically assigned most time resources in TDD to handle DL-heavy mobile traffic. Another advantage is that channel state information (CSI) can be more easily acquired via channel reciprocity. This reduces an overhead associated with CSI reports especially when there is a large number of antennas.

Although there are advantages of TDD over FDD, there are also disadvantages. A first disadvantage is a smaller coverage of TDD due to the usually small portion of time resources available for UL transmissions, while with FDD all time resources can be used for UL transmissions. Another disadvantage is latency. In TDD, a timing gap between DL reception and UL transmission containing the hybrid automatic repeat request acknowledgement (HARQ-ACK) information associated with DL receptions is typically larger than that in FDD, for example by several milliseconds. Therefore, the HARQ round trip time in TDD is typically longer than that with FDD, especially when the DL traffic load is high. This causes increased UL user plane latency in TDD and can cause data throughput loss or even HARQ stalling when a PUCCH providing HARQ-ACK information needs to be transmitted with repetitions in order to improve coverage (an alternative in such case is for a network to forgo HARQ-ACK information at least for some transport blocks in the DL).

To address some of the disadvantages for TDD operation, a dynamic adaptation of link direction has been considered where except for some symbols in some slots supporting predetermined transmissions such as for SSBs, symbols of a slot can have a flexible direction (UL or DL) that a UE can determine according to scheduling information for transmissions or receptions. A PDCCH can also be used to provide a DCI format, such as a DCI format 2_0 as described in REF 3, that can indicate a link direction of some flexible symbols in one or more slots. Nevertheless, in actual deployments, it is difficult for a gNB scheduler to adapt a transmission direction of symbols without coordination with other gNB schedulers in the network. This is because of cross-link interference (CLI) where, for example, DL receptions in a cell by a UE can experience large interference from UL transmissions in the same or neighboring cells from other UEs.

Full-duplex (FD) communications offer a potential for increased spectral efficiency, improved capacity, and reduced latency in wireless networks. When using FD communications, UL and DL signals are simultaneously received and transmitted on fully or partially overlapping, or adjacent, frequency resources, thereby improving spectral efficiency and reducing latency in user and/or control planes.

There are several options for operating a full-duplex wireless communication system. For example, a single carrier may be used such that transmissions and receptions are scheduled on same time-domain resources, such as symbols or slots. Transmissions and receptions on same symbols or slots may be separated in frequency, for example by being placed in non-overlapping sub-bands. An UL frequency sub-band, in time-domain resources that also include DL frequency sub-bands, may be located in the center of a carrier, or at the edge of the carrier, or at a selected frequency-domain position of the carrier. The allocations of DL sub-bands and UL sub-bands may also partially or even fully overlap. A gNB may simultaneously transmit and receive in time-domain resources using same physical antennas, antenna ports, antenna panels and transmitter-receiver units (TRX). Transmission and reception in FD may also occur using separate physical antennas, ports, panels, or TRXs. Antennas, ports, panels, or TRXs may also be partially reused, or only respective subsets can be active for transmissions and receptions when FD communication is enabled.

Instead of using a single carrier, it is also possible to use different component carriers (CCs) for receptions and transmissions by a UE. For example, receptions by a UE can occur on a first CC and transmissions by the UE occur on a second CC having a small, including zero, frequency separation from the first CC.

Furthermore, a gNB can operate with full-duplex mode even when a UE still operates in half-duplex mode, such as when the UE can either transmit and receive at a same time, or the UE can also be capable for full-duplex operation.

Full-duplex transmission/reception is not limited to gNBs, TRPs, or UEs, but can also be used for other types of wireless nodes such as relay or repeater nodes.

Full duplex operation needs to overcome several challenges in order to be functional in actual deployments. When using overlapping frequency resources, received signals are subject to co-channel cross-link interference (CLI) and self-interference. CLI and self-interference cancellation methods include passive methods that rely on isolation between transmit and receive antennas, active methods that utilize RF or digital signal processing, and hybrid methods that use a combination of active and passive methods. Filtering and interference cancellation may be implemented in RF, baseband (BB), or in both RF and BB. While mitigating co-channel CLI may require large complexity at a receiver, it is feasible within current technological limits.

Another aspect of FD operation is the mitigation of adjacent channel CLI because in several cellular band allocations, different operators have adjacent spectrum.

Throughout the disclosure, Cross-Division-Duplex (XDD) is used as a short form for a full-duplex operation. The terms XDD and full-duplex are interchangeably used in the disclosure.

Full-duplex operation in NR can improve spectral efficiency, link robustness, capacity, and latency of UL transmissions. In an NR TDD system, UL transmissions are limited by fewer available transmission opportunities than DL receptions. For example, for NR TDD with SCS=30 kHz, DDDU (2 msec), DDDSU (2.5 msec), or DDDDDDD-SUU (5 msec), the UL-DL configurations allow for an DL:UL ratio from 3:1 to 4:1. Any UL transmission can only occur in a limited number of UL slots, for example every 2, 2.5, or 5 msec, respectively.

Figure 7:
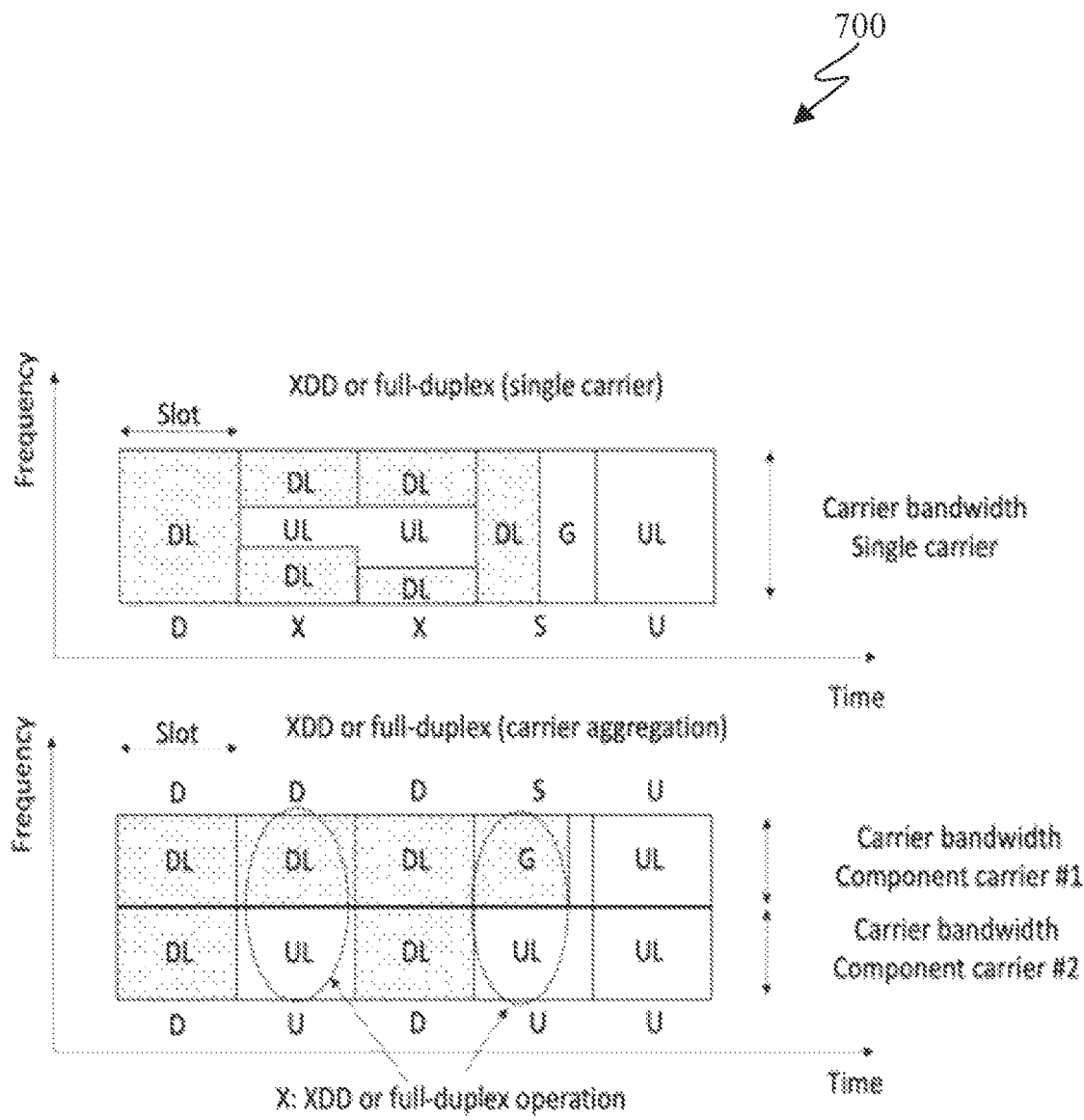
FIG. 7 illustrates example UL-DL frame configurations in a full-duplex communications system according to embodiments of the disclosure.

FIG. 7 illustrates two example full-duplex configurations 700 according to embodiments of the disclosure. The embodiment of the example full-duplex configurations 700 illustrated in FIG. 7 is for illustration only. FIG. 7 does not limit the scope of this disclosure to any particular implementation of the example full-duplex configurations 700.

For a single carrier TDD configuration with full-duplex enabled, slots denoted as X are full-duplex or XDD slots. Both DL and UL transmissions can be scheduled in XDD slots for at least one or more symbols. The term XDD slot is used to refer to a slot where UEs can simultaneously both receive and transmit in at least one or more symbols of the slot if scheduled or assigned radio resources by the base station. A half-duplex UE cannot both transmit and receive simultaneously in an XDD slot or on a symbol(s) of an XDD slot. When a half-duplex UE is configured for transmission in symbols of an XDD slot, another UE can be configured for reception in the symbols of the XDD slot. A full-duplex UE can transmit and receive simultaneously in symbols of an XDD slot, possibly in presence of other UEs scheduled or assigned resources for either DL or UL in the symbols of the XDD slot. Transmissions by a UE in a first XDD slot can use same or different frequency-domain resources than in a second XDD slot, wherein the resources can differ in bandwidth, a first RB, or a location of the center carrier.

For a dual-carrier (carrier aggregation) TDD configuration with full-duplex enabled, a UE receives in a slot on CC #1 and transmits in at least one or more symbol(s) of the slot on CC #2. In addition to D slots used only for transmissions/receptions by a gNB/UE, U slots used only for receptions/transmissions by the gNB/UE, and S slots for also supporting DL-UL switching, full-duplex slots with both transmissions/receptions by a gNB or a UE that occur on same time-domain resources, such as slots or symbols, are labeled by X. For the example of TDD with SCS=30 kHz, single carrier, and UL-DL allocation DXXSU (2.5 msec), the second and third slots allow for full-duplex operation. UL transmissions can also occur in a last slot (U) where the full UL transmission bandwidth is available. XDD slots or symbol assignments over a time period/number of slots can be indicated by a DCI format in a PDCCH reception and can then vary per unit of the time period, or can be indicated by higher layer signaling, such as via a MAC CE or RRC.

When considering UL transmissions in a full-duplex capable wireless communication system several issues of existing state-of-the-art technology need to be overcome. A first issue relates to scheduling for purpose of PUSCH transmissions in XDD slots and full UL slots.

In a full-duplex TDD system, PDCCH reception on the CORESET(s) in the DL subband(s) of many XDD slot(s) is often impeded and at times not possible at all. Depending on the TDD channel bandwidth available to the operator, the configuration of frequency-domain locations and sizes of the configured and/or the active UE DL and UL BWP(s) is subject to constraints. For example, in FR1 band n78 (3.5 GHz), the nominal TDD channel bandwidth can be up to 100 MHz, but about half of the operators only own band segments not more than 40 MHz wide. The XDD or full-duplex TDD system must still be able to operate using these smaller TDD channel bandwidths. The number of RBs and number of symbols allocated to the CORESETs carrying PDCCH determines DL range and link robustness in the TDD deployment. The size of the DL BWP(s) determines the configurable sizes of the CORESETs. In principle, CORESET(s) can be configured to not overlap with the UL subband, e.g., 20 MHz, for large TDD channel bandwidth, e.g., 100 MHz, when available. UE DL power consumption is then greatly increased however due to the need to configure large DL BWPs for the UE. The choice of a smaller DL BWP appropriately dimensioned to support the sustained and instantaneous DL data rates of the UE is often adopted by commercial networks. Partial or full frequency-domain overlap of CORESET(s) with the UL subband in full-duplex system arises due to the need for operation using small DL BWP(s) for purpose of reduced UE power consumption. Configuration of CORESET(s) in partial or full frequency-domain overlap with the UL subband(s) of XDD slot(s) in a TDD system supporting full-duplex operation is unavoidable for smaller TDD channel bandwidths, e.g., 20 or 40 MHz. When the UE is configured with a CORESET in partial or full frequency-domain overlap with the UL subband of the XDD slot, scheduling the UL subband in the XDD slot for UL transmissions by other UE(s) prevents use of the CORESET for purpose of scheduling the UE.

When the TDD UE is implemented for half-duplex operation, e.g., as is common in FR1 with both LTE and NR, the availability of PDCCH for scheduling in a TDD serving cell supporting full-duplex operation is subject to UE half-duplex constraints. The gNB cannot schedule the UE for simultaneous UL transmission and DL reception in the same time domain resources in the XDD slot. PUSCH or PUCCH transmission by the UE prevents PDCCH reception on the same time-domain resources. Note that half-duplex TDD UE also require Tx-Rx and Rx-Tx switching time, e.g., symbols where no DL transmission to the UE or UL reception from the UE is possible, which also must be accounted for by the gNB scheduler. The gNB schedules the UL subband in the XDD slot(s) to improve UL coverage and/or to reduce DL and/or UL data or control transmission latency for the UE. When the UE implements half-duplex operation, the increased use of time-domain resources for purpose of UL transmissions by the UE inevitably decreases the number of available DL slots for PDCCH transmission on the CORESET(s) configured for the UE.

In consequence, the number of available DL slots and/or PDCCH transmission opportunities to UE(s) operating in a TDD cell with support for full-duplex operation is much reduced when compared to a TDD cell without full-duplex support. There is a much greater dependency on gNB scheduling decisions, e.g., availability of PDCCH transmission opportunities in the DL for the UE under consideration will depend on UL scheduling for the UE, but it will also depend on DL and/or UL scheduling allocations made for other UEs in the cell. The use of multi-TTI allocations for PUSCH is a means to overcome the problem of reduced availability for PDCCH transmission opportunities in TDD systems supporting full-duplex transmissions and receptions. A single DCI in a single DL slot can schedule multiple PUSCH transmission instances. Fewer PDCCH transmission opportunities are required and conflicting configurations of CORESET(s) with the UL subband of XDD slot(s) are more easily avoided, e.g., for example when using normal DL slots for scheduling. UL grants with possibility to use multi-TTI allocations for PUSCH also improve the link efficiency in the TDD system. Multi-TTI PUSCH allocations also reduce the Tx-Rx and Rx-Tx switching overhead, e.g., symbols where no data transmission or reception from/to the UE can occur.

The existing Rel-16 & Rel-17 multi-TTI allocation feature for PUSCH uses DCI F0_1. DCI F0_1 allows to signal one MCS value. The UE must employ this one signaled MCS setting for all the PUSCHs in the multi-TTI allocation. One problem is that the single signaled MCS value valid for all PUSCHs in the multi-TTI allocation is not sufficient for scheduling UL transmissions in a TDD system with support for full-duplex transmissions. This is due to distinct experienced signal and interference conditions when comparing the reception from the UE in the XDD and/or full UL slots. Correspondingly, PUSCHs scheduled by means of multi-TTI allocations and received by the gNB in XDD and/or full UL slots experience very different SINR. Note that this is the case even if the UE was to employ the same UL Tx power setting in such slots. In practice however, it can be expected that the UE configured maximum output power and the targeted PUSCH receive power levels by the gNB in a full-duplex slot may often not be the same when compared to a normal UL slot.

First, because of gNB antenna panel design, the UL reception in a full, e.g., normal, UL slot will use a different number of TRX and uses a larger effective Rx area when compared to the UL subband in an XDD slot. A similar consideration applies to gNB DL transmissions in a full, e.g., normal, DL slot versus XDD slots. For example, gNB Rx in a normal UL slot uses all the available 48 TRX using a 12V×8 H×2 P panel of size 40×60 cm. The gNB Rx in XDD slots only uses 16 TRX and ⅓ of the panel for Rx mode whereas the remaining 32 TRX and ⅔ of the panel are used for the simultaneous DL transmissions. The gNB will collect less useful signal energy per received UL symbol in an XDD slot when compared to an UL transmission by the UE in a normal UL slot. There is less link gain when comparing UL reception in XDD vs. normal UL slots. Different antenna and panel designs exist to support gNB-side full-duplex operation. Design options may be expected to evolve over time as technology matures. Existing and expected future design options for antenna and panels have in common that the number of TRXs and the available Tx or Rx aperture area used for Tx and/or Rx in normal DL or UL slots are generally not the same when compared to the DL transmissions or UL receptions in XDD slots.

Second, UL interference levels at the reception site, e.g., gNB, differ between normal UL slots and the XDD slots. In normal UL slots, the gNB is interfered by the UL of neighboring TDD cells on the co- or the first adjacent channels. DL-UL interference is controlled by means of proper dimensioning of the GPs, e.g., typical settings of 2-4 guard symbol account for a sufficiently large safety distance in many TDD deployments. gNB scheduling accounts for the increase in interference levels in the system, e.g., the expected and/or observed rise-over-thermal (RoT) due to presence of UL data or control signal transmissions in the cell and its vicinity. RoT varies as a function of several parameters such as the offered traffic load from UEs and the scheduler implementation. For UL receptions in XDD slots, interference levels experienced the gNB are different. The gNB schedules the DL subband(s) for reception by UEs and UL subband(s) for transmission from UEs by selecting a suitable subset of UEs from a list of possible UE candidate pairings. Which combination(s) of UE pairings for simultaneous DL reception by UEs and UL transmissions from UEs are deemed suitable in a XDD slot first depends on their spatial separation, e.g., the achievable radio isolation between these UEs when assuming UL transmission from a paired UE will impact not only reception of the UL transmission at the gNB reception site, but also DL reception by the other UE in the XDD slot. The possibility of a choice for pairing UEs in an XDD slot secondly depends on the availability of schedulable DL and UL traffic for those UEs. There may not be data or control to be transmitted or received for both UEs in the given transmission interval, e.g., the XDD slot, even if the UEs otherwise qualify for pairing in terms of the spatial isolation budget. In consequence, it can be expected that interference levels vary substantially for the different XDD slots and vary between the XDD and normal UL slots.

Therefore, the MCS needed to best schedule the UE for UL transmissions using a normal UL slot will often need to be different from the MCS needed to schedule the same UE in an XDD slot. Furthermore, the selection of MCS suitable to schedule the UE for UL transmissions may need to vary between a first and a second XDD slot. If the MCS for a given PUSCH transmission from the UE in a slot cannot be chosen optimally by the gNB scheduler, the UL radio range, data throughput and latency are negatively impacted. Note that HARQ (re-)transmissions are an implicit link adaptation mechanism. The choice of the MCS setting (or targeted initial BLER) in a slot by the scheduler determines the achievable latency as trade-off against spectral efficiency for successful transmission of a TB in a HARQ process. Therefore, solutions and methods are sought after to make the use of multi-TTI allocations for PUSCH scheduling practical in a TDD wireless communication system with support for XDD or full-duplex operation.

The disclosure addresses the above issues and provides additional design aspects for supporting UL transmissions with multi-TTI allocations for PUSCH, and provides solutions as fully elaborated in the following. The disclosure considers methods using multiple MCS values to determine the UL transmission parameters such as modulation order, target code rate and/or MCS in a slot of a multi-slot PUSCH allocation. Multiple MCS values can be signaled, provided or determined by the UE. The disclosure considers methods whereby one of multiple MCS values determined by the UE is selected for PUSCH transmission in a slot part of a multi-slot PUSCH transmission.

In the following, unless otherwise explicitly noted, providing a parameter value by higher layers includes providing the parameter value by a system information block (SIB), such as a SIB1, or by a common RRC signaling, or by UE-specific RRC signaling.

The UE determines a first and a second MCS value $MCS_1$ and $MCS_2$ for a multi-slot PUSCH transmission in a serving cell. The first MCS value $MCS_1$ for a serving cell is associated with multi-slot PUSCH transmission by the UE in a first set of slots of the serving cell. The second MCS value $MCS_2$ for a serving cell is associated with multi-slot PUSCH transmission by the UE in a second set of slots on the serving cell. An MCS value may be used by the UE to determine UL transmission parameters for PUSCH transmission in one or multiple slots where UL transmission parameters may include a modulation order, target code rate, and/or transport block size. A first and a second MCS value $MCS_1$ and $MCS_2$ associated with the UL transmission parameters for PUSCH in different MCS slot groups may be provided to the UE by one or a combination of L1 control signaling by DCI, RRC signaling and/or configuration, tabulated and/or listed by system operating specifications, or MAC CE signaling. Only a first MCS value $MCS_1$ associated with the multi-slot PUSCH transmission may be provided to the UE by DCI whereas a second MCS value $MCS_2$ for the multi-slot PUSCH transmission may be determined by the UE by, e.g., from RRC, MAC CE or from system specifications. The determination of a second MCS value $MCS_2$ for the multi-slot PUSCH transmission by the UE may depend on and be a function of a first provided MCS value $MCS_1$, e.g., the UE determines $MCS_2$ as a relative value compared to or as offset to $MCS_1$. A first or a second MCS value $MCS_1$ and $MCS_2$ associated with a multi-slot PUSCH transmission on a serving cell may be provided to or determined by the UE by means of index values $I_{MCS1}$ and $I_{MCS2}$ respectively.

The UE may determine the UL transmission parameters for PUSCH in a slot using either the first or the second MCS value $MCS_1$ or $MCS_2$. A first MCS value $MCS_1$ may be used by the UE to determine UL transmission parameters for PUSCH in normal UL slots. A second MCS value $MCS_2$ may be used by the UE to determine UL transmission parameters for PUSCH in a full-duplex slot. The UE may determine the UL transmission parameters for PUSCH in a slot using both the first and the second MCS value $MCS_1$ and $MCS_2$. The first and second set of slots of the serving cell associated with a first and a second MCS value $MCS_1$ and $MCS_2$ for a multi-slot PUSCH transmission may be referred to as a first MCS Slot Group $MSG_1$ and a second MCS Slot Group $MSG_2$. A UE may be configured with one or more MCS Slot Group(s) (MSG(s)) for multi-slot PUSCH transmission on a serving cell where an MSG is a set of slots of a serving cell associated with a same signaled MCS value. A UE may select an MCS value associated with UL transmission in a slot by determining a slot type when scheduled a multi-slot PUSCH transmission.

The UE determines a first and a second MCS value $MCS_1$ and $MCS_2$ for a multi-slot PUSCH transmission in a serving cell. The first MCS value MCS1 for a serving cell is associated with multi-slot PUSCH transmission by the UE in a first set of slots of the serving cell. The second MCS value $MCS_2$ for a serving cell is associated with multi-slot PUSCH transmission by the UE in a second set of slots on the serving cell. An MCS value may be used by the UE to determine UL transmission parameters for PUSCH transmission in one or multiple slots where UL transmission parameters may include a modulation order, target code rate, and/or transport block size.

Figure 8:
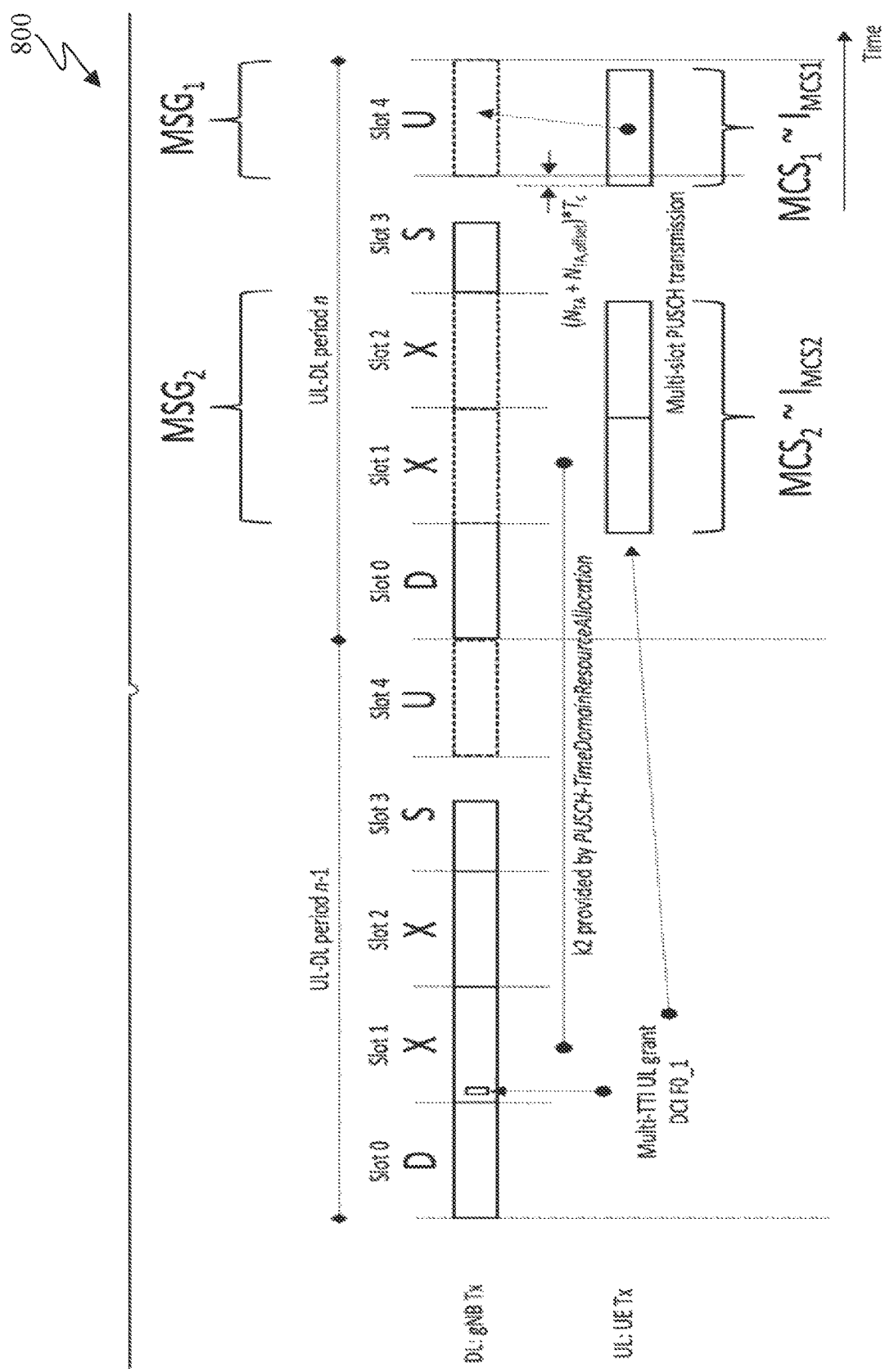
FIG. 8 illustrates a multi-slot PUSCH transmission with a first and a second MCS value according to the embodiments of the disclosure.

FIG. 8 illustrates an exemplary multi-slot PUSCH transmission with a first and a second MCS value 800 according to the embodiments of the disclosure. The embodiment of the multi-slot PUSCH transmission with a first and a second MCS value 800 illustrated in FIG. 8 is for illustration only. FIG. 8 does not limit the scope of this disclosure to any particular implementation of the exemplary multi-slot PUSCH transmission with a first and a second MCS value 800.

As shown in FIG. 8, a first MCS slot group $MSG_1$ contains the normal UL slot, e.g., slot 4 and a second MCS slot group $MSG_2$ contains the full-duplex slots, e.g., slots 1 and 2, where slots are numbered from 0 to 4. The UE determines a first MCS value $MCS_1$ for $MSG_1$ and a second MCS value $MCS_2$ for $MSG_2$. For example, the UE determines the first MCS value $MCS_1$ from the signaled MCS index value $I_{MCS}$ provided by the scheduling DCI F0_1 in slot 1 of UL-DL period n−1, e.g., $I_{MCS1}=I_{MCS}$. The UE determines the second MCS value $MCS_2$ from the same MCS index value $I_{MCS}$ provided by the scheduling DCI while applying a relative offset value provided as parameter deltaMCS, e.g., $I_{MCS2}=I_{MCS}$+deltaMCS. For example, a value for the parameter deltaMCS may be provided to the UE by RRC configuration using IE PUSCH-TimeDomain-ResourceAllocation. In another example, the UE may determine the first and the second MCS values $MCS_1$ and $MCS_2$ for a multi-slot PUSCH transmission in a serving cell from a first signaled MCS index value $I_{MCS1}$ and a second signaled MCS index value $I_{MCS2}$ both provided by the scheduling DCI F0_1. Several solutions for determination by the UE of a first and a second MCS value $MCS_1$ and $MCS_2$ are described in the following exemplary embodiments of the disclosure. In the example of FIG. 8, when the UE is scheduled for a multi-slot PUSCH transmission, the UE determines the UL transmission parameters associated with the PUSCH transmission in $MSG_1$ using $MCS_1$ when it transmits in the normal UL slot. The UE determines the UL transmission parameters associated with the PUSCH transmission in full-duplex slots 1 or 2 using the $MCS_2$ of $MSG_2$. UL transmission parameters may include a modulation order, target code rate, and/or transport block size.

Using a first and a second MCS value $MCS_1$ and $MCS_2$ in a multi-slot PUSCH allocation for a UE in a serving cell to control the UL transmission parameters of the UE, the modulation order, target code rate, and/or transport block size can be set and adjusted for separately by the gNB for that UE in normal UL slot(s) and in full-duplex slot(s). For example, the gNB can make use of different modulation orders or target code rate when scheduling a multi-slot PUSCH transmission for a UE which comprises a full-duplex slot and normal UL slot. For PUSCH reception in a slot corresponding to multi-slot PUSCH transmission from a scheduled UE, the gNB can adjust its receiver processing accordingly because the first and second MCS values $MCS_1$ and $MCS_2$ of the multi-slot PUSCH allocation associated with the PUSCH transmission received in a particular slot or transmission interval are known. The gNB can use suitable gNB-side and/or UE-reported measurements to determine the link adaptation settings for the UE in full-duplex slot and/or normal UL slot(s). For example, UE-transmitted SRS and/or measurements reported from one or multiple UE(s) using the cross-link interference management reporting feature may be used by the gNB to determine the appropriate link adaptation setting for a UE in a slot when using the multi-slot PUSCH scheduling on a serving cell.

In one embodiment, a first or a second MCS value $MCS_1$ and $MCS_2$ associated with the UL transmission parameters for PUSCH in different MCS slot groups may be provided to the UE by L1 control signaling such as a DCI.

In one example, the first MCS value $MCS_1$ is provided to the UE in a first information field "Modulation and coding scheme" and the second MCS value $MCS_2$ is provided to the UE in a second information field "Second Modulation and coding scheme" by a same DCI. The first and the second information field are separate and allow for independent settings of the first or the second MCS value $MCS_1$ and $MCS_2$ associated with the UL transmission parameters when scheduling the multi-slot PUSCH transmission. The first and the second information field can have the same length or the lengths of the first and second information fields can be different. The UE may be configured by higher layer signaling to use the same MCS index table or to use different MCS index tables for determining modulation order, target code rate and/or TB size using the first or the second information field when receiving the MCS indexes in the scheduling DCI.

For example, the first and the second information fields can have the same lengths, e.g., $M_1=M_2=M=5$ bits where $M_1$ denotes the length of the first information field "Modulation and coding scheme" and $M_2$ denotes the length of the second information field "Second Modulation and coding scheme". A motivation is that the gNB can schedule and select a suitable PUSCH modulation order, target code rate and TB size in a normal UL slot independently from the PUSCH modulation order, target code rate and TB size of a full-duplex slot. The gNB can make use of the full available $M=5$ bit resolution of the modulation and coding scheme information field in each type of slot, e.g., of type full-duplex or normal UL slot, when scheduling and selecting the first signaled MCS index $I_{MCS}$ of the first information field "Modulation and coding scheme" and when selecting a second signaled MCS index $I_{MCS}$ of the second information field "Second Modulation and coding scheme" for a configured MCS index table provided by REF4. Note that different MCS settings determining the modulation order, target code rate and TB size may also be required for different full-duplex slots.

For example, the first and the second information field can have different lengths, e.g., $M_1=5$ bits but $M_2<M_1$, e.g., $M_2=3$ bits. A motivation is that the resulting DCI payload size from duplicating the Modulation and coding scheme information fields for purpose of providing the UL transmission parameters associated with the multi-slot PUSCH transmission is reduced. This increases DL link robustness and is beneficial for DCI size alignment. The gNB can schedule and select a suitable PUSCH modulation order, target code rate and TB size in a normal UL slot for the PUSCH modulation order, target code rate and TB size for a subset of slots part of the multi-slot PUSCH transmission. The gNB can make use of the full $M_1=5$ bit resolution provided by the available MCS index tables in REF4 when mapping the first signaled MCS index $I_{MCS}$ of the first information field "Modulation and coding scheme" such as when scheduling in the normal UL. The gNB has a reduced number of index values of a configured MCS index table in REF4 available when scheduling the UE in a full-duplex slot. In full-duplex slots where the possibilities for link adaptation settings can be expected to be more limited due to signal conditions when compared to a normal UL slot, this may be sufficient when for providing the MCS index $I_{MCS}$ of the second information field "Second Modulation and coding scheme".

When the UE is configured by higher layers to use the same MCS index table provided by REF4 to determine the modulation orders, target code rate and/or TB size associated with the first and the second MCS value $MCS_1$ and $MCS_2$ respectively, any existing MCS index table provided by REF4 may be configured for multi-slot PUSCH transmission such as for example any of PUSCH MCS index tables 1 or 2 with transform precoding or PDSCH MCS index tables 1-3 of type "qam256", "qam64LowSE", etc.

When the UE is configured by higher layers to use different MCS index tables provided by REF4 to determine the modulation orders, target code rate and/or TB size associated with the first and the second MCS value $MCS_1$ and $MCS_2$ respectively, any existing MCS index table provided by REF4 may be configured for either the first information field "Modulation and coding scheme" and the second information field "Second Modulation and coding scheme" scheduled by the DCI. When receiving the DCI scheduling the multi-slot PUSCH transmission, the UE determines a modulation order, target code rate and/or TB size for UL slots associated with the signaled MCS index value from the first information field using the first configured MCS index table and a modulation order, target code rate and/or TB size for UL slots associated with the signaled MCS index value from the second information field using the second configured MCS index table.

When a reduced number of bits for the second information field is used, e.g., $M_1=5$ bits but $M_2<M_1$, e.g., $M_2=3$ bits, an associated mapping to a reduced set of row indices from a configured MCS index table can be used. For example, when $M_2=3$ bits are used to indicate an MCS index, for example the provided index in the DCI then assigns from the first 8 MCS indexes from any of the existing MCS index tables provided by REF4. A motivation is that in full-duplex slots where operating spectral efficiency can be somewhat lower than in normal UL slots, a modulation schemes such as QPSK, or smaller TB sizes can suffice in the UL slots part of the multi-slot PUSCH allocation. Alternatively, the resulting index values from the signaled $M_2=3$ bits of the second information field can sample a suitable range of the configured MCS index table. For example, the signaled $M_2=3$ bits map to every $4^{th}$ index value in an existing PDSCH or PUSCH index table. The sampling does not need to be regular or equally spaced, e.g., any desired mapping of the 8 resulting index values with $M_2=3$ bits can be assigned when addressing a subset of entries from a 5-bit or 32 entry MCS table, incl. entries or codepoints scheduling a re-transmission of a TB in a HARQ process using previously determined modulation order, target code rate and/or TB size values.

Figure 9:
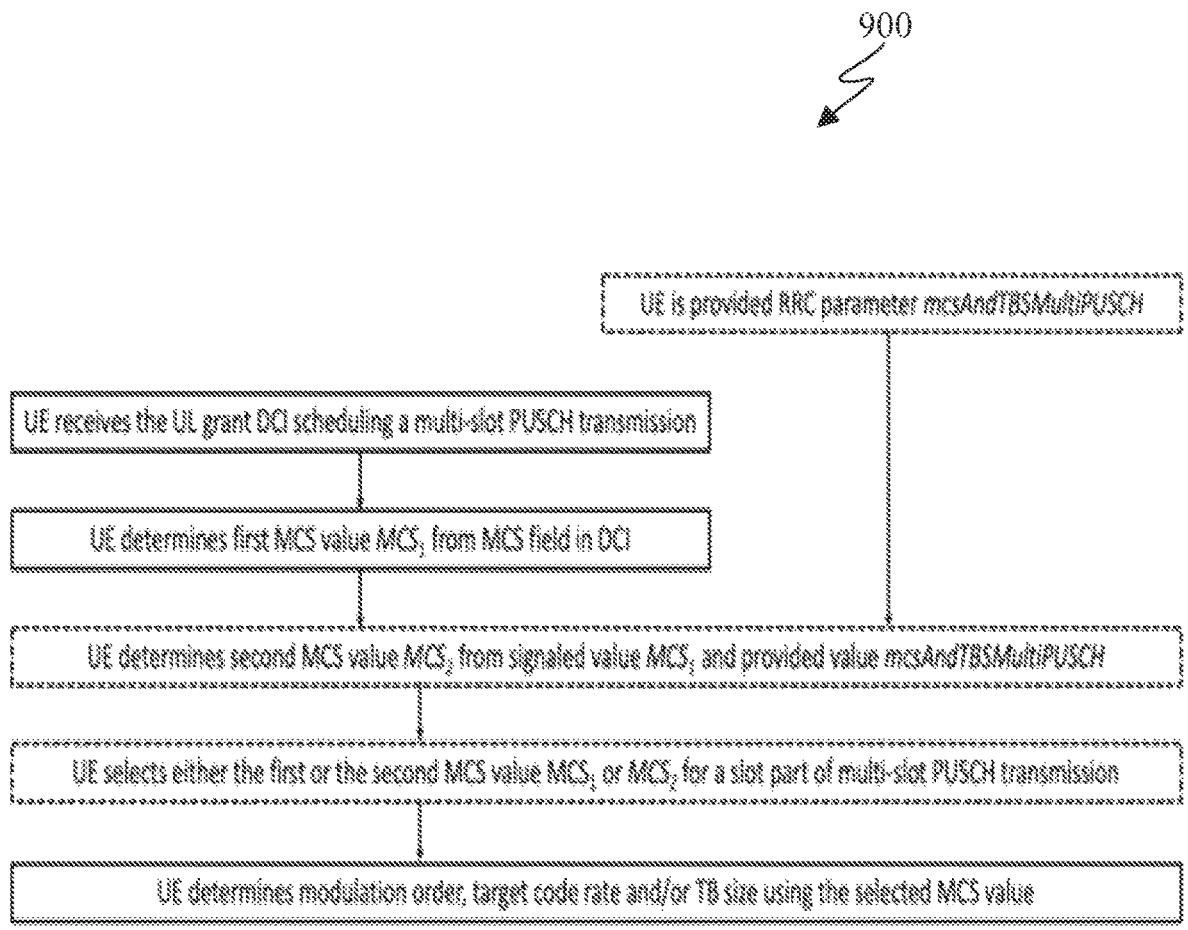
FIG. 9 illustrates UE processing steps for multi-slot PUSCH transmission with a second MCS value provided by higher layers according to the embodiments of the disclosure.

FIG. 9 illustrates UE processing steps for multi-slot PUSCH transmission with a second MCS value provided by higher layers 900 according to the embodiments of the disclosure. The embodiment of the UE processing steps for multi-slot PUSCH transmission with a second MCS value provided by higher layers 900 illustrated in FIG. 9 is for illustration only. FIG. 9 does not limit the scope of this disclosure to any particular implementation of the UE processing steps for multi-slot PUSCH transmission with a second MCS value provided by higher layers 900.

When the UE determines the numbers of REs $N'_{RE}$ allocated for a PUSCH within a PRB, higher layers may configure a same or different value $N^{PRB}_{OH}$ for the parameter xOverhead in PUSCH-ServingCellConfig for the slots scheduled in the multi-slot PUSCH transmission. If a same value $N^{PRB}_{OH}$ is configured for all slots schedulable by the configured pusch-TimeDomainAllocationList-ForMultiPUSCH, the UE determines a same value for the number of REs $N'_{RE}$ allocated for a PUSCH within a PRB. The UE then determines the resulting modulation order, target code rate and TB size in a PUSCH slot part of the multi-slot PUSCH allocation as a function of the first information field "Modulation and coding scheme" and the second MCS value $MCS_2$ provided to the UE in the second information field "Second Modulation and coding scheme" in the DCI. If different values $N^{PRB}_{OH}$ are configured for some or all slots schedulable by the configured pusch-TimeDomainAllocationList-ForMultiPUSCH, the UE determines the resulting modulation order, target code rate and TB size in a first PUSCH slot part of the multi-slot PUSCH allocation using the first information field "Modulation and coding scheme" and a first parameter $N^{PRB}_{OH,1}$ associated with a slot and using the second MCS value $MCS_2$ provided to the UE in the second information field "Second Modulation and coding scheme" and a second parameter $N^{PRB}_{OH,2}$ associated with a slot. A motivation is to provide a second control parameter in addition to the MCS information fields for the gNB when scheduling the UE in different types of slots, e.g., full-duplex and/or normal slots, to select a suitable resulting target code rate and TB size.

In another example, the first MCS value $MCS_1$ is provided to the UE in a first information field "Modulation and coding scheme" and the second MCS value $MCS_2$ is provided to the UE in a second information field "Second Modulation and coding scheme" by a same DCI. The second information field is an offset or delta value compared to the first information field. The first and the second MCS value $MCS_1$ and $MCS_2$ associated with the UL transmission parameters when scheduling the multi-slot PUSCH transmission allow for independent settings in a first and a second type of UL slot, e.g., a normal UL slot or a full-duplex slot, but the MCS index range of the second type of UL slot schedulable by the gNB is conditioned on the MCS index assignment of the first type of UL slot. The first and the second information field will typically use different lengths. For example, $M_1=5$ bits but $M_2<M_1$, e.g., $M_2=2$ bits to provide to the UE a reduced set of assignable MCS index values in UL slots of a multi-slot PUSCH allocation associated with the second MCS value which is conditioned on the assigned first MCS index value in the scheduling DCI. For example, when $M_2=2$ bits are used to indicate an MCS index, the provided index of the second information field in the DCI then assigns from MCS indexes j to j–7 where j is the MCS signaled index of the first information field in the DCI. When the first signaled MCS index is associated with normal UL slots, the UE determines a lower second MCS index associated with the full-duplex slots, e.g., the UE is assigned a more conservative setting in the full duplex slots and uses a lower modulation order, target code rate and/or TB size. A motivation is to reduce the DCI payload scheduling multi-slot PUSCH similar to the case of 2 independent MCS fields with different field lengths. Another motivation is that the link adaptation setting in a full-duplex slot is set dependent on the MCS value assigned by the gNB for a normal UL slot. This is desirable because the received UL power level at the gNB for PUSCH transmissions from the UE in different types of slots, e.g., normal UL slot or full-duplex slot, can be controlled by the gNB using the same UL power control settings.

For determination of the modulation order, target code rate and/or TB size using the first information field "Modulation and coding scheme" and received index value $MCS_1$, the UE may be configured with any existing MCS index table provided by REF4 such as the PUSCH MCS index tables 1 or 2 with transform precoding or PDSCH MCS index tables 1-3 of type "qam256", "qam64LowSE", etc. For determination of the modulation order, target code rate and/or TB size using the second information field "Second Modulation and coding scheme" and received relative or offset index value $MCS_{Delta}$, the UE may assume that the same MCS index table is used, where the lowest MCS index in the configured MCS index table is applied in case the computed MCS index $MCS_1$-$MCS_{Delta}$ results in a negative value. The UE may be provided by higher layer signaling and configuration a minimum and/or a maximum MCS index value for PUSCH transmission in a slot of the multi-PUSCH allocations, e.g., a threshold value for a minimum or maximum MCS is provided to the UE such that computed MCS index $MCS_1$-$MCS_{Delta}$ does not result in value smaller and/or larger than permitted by the configured range. A motivation is to allow for link adaptation settings in a full-duplex slot associated with the second information field, but not to exceed a given range of possible MCS assignments to better control interference in a full-duplex slot. The gNB knows the scheduled MCS indices and can determine the resulting modulation order, targeted coding rate and/or TB size in presence of a configured minimum required and/or maximum allowed MCS index setting and adjust its receiver processing accordingly. Alternatively, the UE can determine a resulting MCS index after receiving $MCS_1$ and $MCS_{Delta}$ values by mapping to a suitably configured subset of the MCS index table. For example, the signaled $M_2=2$ bits corresponding to the $MCS_{Delta}$ values map to a set of 4 index values in an existing PDSCH or PUSCH index table provided by REF4. The sampling does not need to be regular or equally spaced, e.g., any desired mapping of the 4 resulting index values with $M_2=2$ bits can be assigned when addressing a subset of entries from a 5-bit or 32 entry MCS index table, incl. entries or codepoints scheduling a re-transmission of a TB in a HARQ process using previously determined modulation order, target code rate and/or TB size values.

In one embodiment, a first or a second MCS value $MCS_1$ and $MCS_2$ associated with the UL transmission parameters for PUSCH in different MCS slot groups is provided to the UE by higher layers, e.g., configured by RRC signaling and/or configuration.

In one example, the first MCS value $MCS_1$ is provided to the UE in an information field "Modulation and coding scheme" of a scheduling DCI and the second MCS value $MCS_2$ is provided to the UE by a higher layer parameter mcsAndTBSmultiPUSCH. The first and the second provided MCS value may be separate and allow for independent settings of the first or the second MCS value $MCS_1$ and $MCS_2$ associated with the UL transmission parameters when scheduling the multi-slot PUSCH transmission, or the second provided MCS value may be used together with the first signaled MCS value to determine a resulting MCS value. The first MCS value $MCS_1$ is provided to the UE by DCI and the second MCS value $MCS_2$ provided by higher layer signaling. The values can have the same length, e.g., the same number of bits or same number of addressable codepoints or their respective lengths can be different. When determining a modulation order, target code rate and/or TB size associated with the first or the second MCS value $MCS_1$ or $MCS_2$, the UE may be configured by higher layer signaling to use a same MCS index table or to use different MCS index tables for the DCI signaled first MCS value $MCS_1$ and the provided second MCS value $MCS_2$.

For example, the first MCS value $MCS_1$ signaled to the UE in an information field "Modulation and coding scheme" of a scheduling DCI and the second MCS value $MCS_2$ provided to the UE by a higher layer parameter mcsAndTBSmultiPUSCH can have the same or different lengths, e.g., $M_1=M_2=M=5$ bits or $M_1 \neq M_2$ where $M_1$ denotes the length of the information field "Modulation and coding scheme" in the scheduling DCI and $M_2$ denotes loge of the number of possible values of the higher layer parameter mcsAndTBSmultiPUSCH. A motivation is that the gNB can schedule and select a suitable PUSCH modulation order, target code rate and TB size in a normal UL slot independently from the PUSCH modulation order, target code rate and TB size of a full-duplex slot. The gNB can make use of the full available M=5 bit or 32 codepoints of the modulation and coding scheme information field signaled by DCI to schedule PUSCH as part of the multi-slot PUSCH allocation in a normal UL slot by selecting the first signaled MCS index $I_{MCS}$ of the information field "Modulation and coding scheme". The MCS value of the second provided MCS index $I_{MCS}$ through the higher layer parameter mcsAndTBSmultiPUSCH in a full-duplex slot is set to a configured value. Note that different MCS settings determining the modulation order, target code rate and TB size may also be required for different full-duplex slots.

When the UE is signaled the first MCS value $MCS_1$ by DCI in an information field "Modulation and coding scheme" and the second MCS value $MCS_2$ is provided to the UE by a higher layer parameter mcsAndTBSmultiPUSCH, an MCS index table provided by REF4 to determine the modulation orders, target code rate and/or TB size associated with the first and the second MCS value $MCS_1$ and $MCS_2$ respectively can be used. Any existing MCS index table provided by REF4 may be configured for multi-slot PUSCH transmission such as for example any of PUSCH MCS index tables 1 or 2 with transform precoding or PDSCH MCS index tables 1-3 of type "qam256", "qam64LowSE", etc. Possibly, different MCS index tables provided by REF4 to determine the modulation orders, target code rate and/or TB size associated with the first DCI-signaled and the second provided MCS value $MCS_1$ and $MCS_2$ respectively may be configured for the UE. When receiving the DCI scheduling the multi-slot PUSCH transmission, the UE determines a modulation order, target code rate and/or TB size for UL slots associated with the DCI signaled MCS index value from the information field using the first configured MCS index table and determines a modulation order, target code rate and/or TB size for UL slots associated with the higher layer provided MCS index value using the second configured MCS index table.

In another example, when the UE is signaled the first MCS value $MCS_1$ by DCI in an information field "Modulation and coding scheme" and the second MCS value $MCS_2$ is provided to the UE by a higher layer parameter mcsAndTBSmultiPUSCH, the second MCS value $MCS_2$ is an offset or delta value compared to the first MCS value $MCS_1$ signaled by DCI. When scheduling the multi-slot PUSCH transmission, independent settings in a first and a second type of UL slot, e.g., a normal UL slot or a full-duplex slot can be applied by the gNB. The MCS index range of the second type of UL slot schedulable by the gNB is conditioned on the MCS index assignment of the first type of UL slot. The first MCS value $MCS_1$ signaled by DCI and the second MCS value $MCS_2$ will typically use different lengths. For example, $M_1=5$ bits but $M_2<M_1$, e.g., $M_2=2$ bits are used to determine a number of possible delta or offset value settings by means of the higher layer parameter mcsAndTBSmultiPUSCH. The UE determines an MCS index value in UL slots of a multi-slot PUSCH allocation associated with the second MCS value $MCS_2$ conditioned on the DCI signaled first MCS index $MCS_1$ value in the scheduling DCI. For example, when the DCI signaled first MCS value $MCS_1$ provides an MCS index j, the UE determines the second MCS value $MCS_2=$j minus the provided offset value by parameter mcsAndTBSmultiPUSCH. When the first signaled MCS index is associated with normal UL slots, the UE determines a lower second MCS index associated with the full-duplex slots using a fixed offset value, e.g., the UE reduces the MCS in a full-duplex slot to a more conservative setting and therefore determines a lower modulation order, target code rate and/or TB size. A motivation is to reduce the DCI payload for scheduling multi-slot PUSCH while maintaining gNB control over MCS assignments in full-duplex slot. The DCI can use a single "Modulation and coding scheme" information field, e.g., an existing DCI F0_1 for scheduling multiple PUSCH can be used in the full-duplex system. The gNB through provision of a higher layer parameter controls the fixed MCS offset for the full-duplex slots part of the multi-slot PUSCH allocation. FIG. 9 shows the corresponding UE processing steps.

For determination of the modulation order, target code rate and/or TB size using the first information field "Modulation and coding scheme" and received index value $MCS_1$, the UE may be configured with any existing MCS index table provided by REF4 such as the PUSCH MCS index tables 1 or 2 with transform precoding or PDSCH MCS index tables 1-3 of type "qam256", "qam64LowSE", etc. For determination of the modulation order, target code rate and/or TB size using the relative or offset index value indicated by higher layer parameter mcsAndTBSmultiPUSCH, the UE may assume that the resulting computed MCS index uses the same MCS index table. Alternatively, mapping to a different MCS table may be configured for the resulting computed MCS index. The UE may be provided by higher layer signaling and configuration a minimum required and/or a maximum allowed MCS index value for PUSCH transmission in a slot of the multi-PUSCH allocations, e.g., a threshold value for a minimum or maximum MCS is provided to the UE such that resulting computed MCS index $MCS_1$ minus the provided offset value by parameter mcsAndTBSmultiPUSCH does not result in value smaller and/or larger than permitted by the configured range. A motivation is to allow for link adaptation settings in a full-duplex slot controlled through the higher layer provided offset, but not to exceed a given range of possible MCS assignments to better control interference in a full-duplex slot. The gNB knows the scheduled MCS indices and can determine the resulting modulation order, targeted coding rate and/or TB size in presence of a configured minimum required and/or maximum allowed MCS index setting and adjust its receiver processing accordingly.

A UE may be provided a higher layer parameter mcsAndTBSmultiPUSCH by RRC signaling and configuration. The parameter may be included in one or more signaling messages and/or IEs. For example, and without loss of generality, the parameter mcsAndTBSmultiPUSCH may be signaled from the gNB to the UE as part of RRC signaling messages of type RRCSetup, RRCReconfiguration, SIB1 or SystemInformation and may be included in RRC IEs of type ServingCellConfig, ServingCellConfigCommon, or ServingCellConfigSIB1 where an RRC configuration parameter may be of enumerated, listed or sequence type and/or may be encoded as a bit string.

In one example, the parameter mcsAndTBSmultiPUSCH may be included into an information element of type PUSCH-TimeDomainResourceAllocation as exemplified by the ASN.1 encoding example shown in TABLE 1. The example can be generalized to include the possibility of providing multiple configured parameters mcsAndTBSmultiPUSCH for a multi-slot PUSCH time-domain allocation, e.g., different absolute or relative offset settings per slot or per group of slots, A same or different absolute or relative offset values can be provided for a given slot of the multi-slot PUSCH allocation when assigning different absolute or relative offset values to different row indexes where the slot occurs in the PUSCH-TimeDomainResourceAllocation table.

TABLE 1

Multi-slot PUSCH with a second MCS value provided by higher layers
PUSCH-TimeDomainResourceAllocationList
PUSCH-TimeDomainResourceAllocation information element

```
-- ASN1START
-- TAG-PUSCH-TIMEDOMAINRESOURCEALLOCATIONLIST-START
PUSCH-TimeDomainResourceAllocationList ::= SEQUENCE (SIZE(1..maxNrofUL-Allocations)) OF PUSCH-
TimeDomainResourceAllocation
PUSCH-TimeDomainResourceAllocation ::= SEQUENCE {
    k2                      INTEGER(0..32)           OPTIONAL, -- Need S
    mappingType             ENUMERATED {typeA, typeB},
    startSymbolAndLength    INTEGER (0..127)
}
PUSCH-TimeDomainResourceAllocationList-r16 ::= SEQUENCE (SIZE(1..maxNrofUL-Allocations-r16)) OF PUSCH-
TimeDomainResourceAllocation-r16
PUSCH-TimeDomainResourceAllocation-r16 ::= SEQUENCE {
    k2-r16                  INTEGER(0..32)        OPTIONAL, -- Need S
    puschAllocationList-r16    SEQUENCE (SIZE(1..maxNrofMultiplePUSCHs-r16)) OF PUSCH-Allocation-r16,
...
}
PUSCH-Allocation-r16 ::= SEQUENCE {
    mappingType-r16         ENUMERATED {typeA, typeB}        OPTIONAL, -- Cond NotFormat01-
02-Or-TypeA
    startSymbolAndLength-r16    INTEGER (0..127)             OPTIONAL, -- Cond NotFormat01-02-Or-
TypeA
    startSymbol-r16         INTEGER (0..13)                  OPTIONAL, -- Cond RepTypeB
    length-r16              INTEGER (1..14)                  OPTIONAL, -- Cond RepTypeB
    numberOfRepetitions-r16    ENUMERATED {n1, n2, n3, n4, n7, n8, n12, n16} OPTIONAL, -- Cond
Format01-02
...,
}
PUSCH-TimeDomainResourceAllocationList-r19 ::= SEQUENCE (SIZE(1..maxNrofUL-Allocations-r16)) OF PUSCH-
TimeDomainResourceAllocation-r19
PUSCH-TimeDomainResourceAllocation-r19 ::= SEQUENCE {
    puschAllocationList-r19    SEQUENCE (SIZE(1..maxNrofMultiplePUSCHs-r16)) OF PUSCH-Allocation-r19,
...
}
PUSCH-Allocation-r19 ::= SEQUENCE {
    k2-r19                  INTEGER(0..128)       OPTIONAL, -- Need S
    mcsAndTBSMultiPUSCH                           INTEGER(0..31)  OPTIONAL, -- Need S
....pusch-Allocation-r19    PUSCH-Allocation-r16
...,
}
-- TAG-PUSCH-TIMEDOMAINRESOURCEALLOCATIONLIST-STOP
-- ASN1STOP
```

In one embodiment, a first or a second MCS value $MCS_1$ and $MCS_2$ associated with the UL transmission parameters for PUSCH in different MCS slot groups may be provided to the UE by system operating specifications, e.g., tabulated and/or listed.

In one example, the first MCS value $MCS_1$ is provided to the UE in an information field "Modulation and coding scheme" of a scheduling DCI and the UE determines a second MCS value $MCS_2$ by selecting a value from a set of tabulated or listed values provided by system specifications. The first signaled MCS value and the second provided MCS value may be separate and allow for independent settings of the first or the second MCS value $MCS_1$ and $MCS_2$ associated with the UL transmission parameters when scheduling the multi-slot PUSCH transmission, or the second provided MCS value may be used together with the first signaled MCS value to determine a resulting MCS value. The values can have the same length, e.g., the same number of bits or same number of addressable codepoints or their respective lengths can be different. When determining a modulation order, target code rate and/or TB size associated with the first or the second MCS value $MCS_1$ or $MCS_2$, the UE may be configured by higher layer signaling to use a same MCS index table or to use different MCS index tables for the DCI signaled first MCS value $MCS_1$ and the second MCS value $MCS_2$ determined by the UE by selecting a value from a set of tabulated or listed values provided by system specifications. Multiple sets of parameter values may be provided.

TABLE 2 shows an example for tabulated and listed sets of delta MCS values. When the UE is signaled the first MCS value $MCS_1$ by DCI in an information field "Modulation and coding scheme", a second MCS value $MCS_2$ is determined by the UE from a tabulated or listed set. The UE determines MCS value $MCS_2$ as offset or delta value compared to the first MCS value $MCS_1$ signaled by DCI. The UE determines an MCS index value in UL slots of a multi-slot PUSCH allocation associated with the second MCS value $MCS_2$ conditioned on the DCI signaled first MCS index $MCS_1$ value in the scheduling DCI. For example, when the DCI signaled first MCS value $MCS_1$ provides an MCS index j, the UE determines the second MCS value $MCS_2$ from the first column or second column set in TABLE 2 for a given delta MCS index. In one example, the UE is configured by higher layers which delta MCS index and/or delta MCS set to use. When the UE is configured to use delta MCS index=1, it determines the second MCS value $MCS_2$ as j−4 in case the use of Set 1 is configured but determines the second MCS value $MCS_2$ as j−2 in case the use of Set 2 is configured.

When the first DCI signaled MCS index is associated with normal UL slots, the UE determines a lower second MCS index associated with the full-duplex slots using a fixed offset value, e.g., the UE reduces the MCS in a full-duplex slot to a more conservative setting and therefore determines a lower modulation order, target code rate and/or TB size. Multiple sets can be configured possibly allowing for different offset ranges. One motivation is to reduce the DCI payload for scheduling multi-slot PUSCH while maintaining gNB control over MCS assignments in full-duplex slot. The DCI can use a single "Modulation and coding scheme" information field, e.g., an existing DCI F0_1 for scheduling multiple PUSCH can be used in the full-duplex system. The gNB through provision of a higher layer parameter controls the selected delta MCS offset value for the full-duplex slots part of the multi-slot PUSCH allocation. Different sets of delta MCS offset values can be provided for multi-slot PUSCH allocations.

TABLE 2

Example of tabulated delta MCS values for multi-slot PUSCH allocations

| delta MCS index value | Set 1 | Set 2 |
|---|---|---|
| 0 | j − 6 | j − 4 |
| 1 | j − 4 | j − 2 |
| 2 | j − 2 | j |
| 3 | j − 1 | j + 4 |

Figure 10:
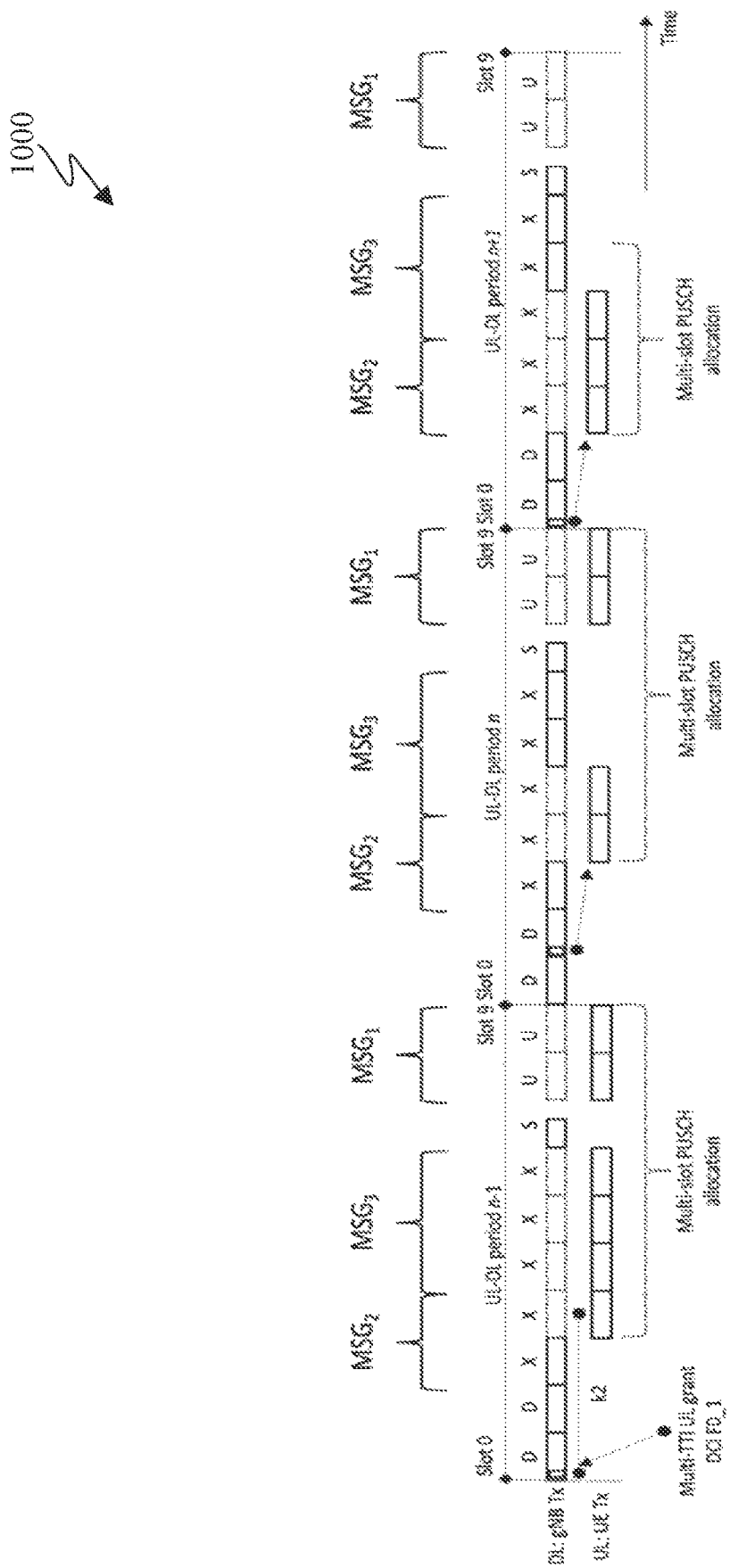
FIG. 10 illustrates a multi-slot PUSCH with MCS slot groups according to the embodiments of the disclosure.

FIG. 10 illustrates a multi-slot PUSCH with MCS slot groups 1100 according to the embodiments of the disclosure. The embodiment of the multi-slot PUSCH with MCS slot groups 1000 illustrated in FIG. 10 is for illustration only. FIG. 10 does not limit the scope of this disclosure to any particular implementation of the multi-slot PUSCH with MCS slot groups 1000.

In one embodiment, a UE may be configured with one or more MCS Slot Group(s) (MSG(s)) for multi-slot PUSCH transmission on a serving cell where an MSG is a set of slots of a serving cell associated with a same signaled MCS value. The first and second set of slots of the serving cell associated with a first and a second MCS value $MCS_1$ and $MCS_2$ for a multi-slot PUSCH transmission may be referred to as a first MCS Slot Group $MSG_1$ and a second MCS Slot Group $MSG_2$. An MSG containing a normal UL slot may be referred to as Primary MCS Slot Group (PMSG), whereas the term Secondary MCS Slot Group (SMSG) may refer to other MSGs. For example, an SMSG may be configured to comprise slots where full-duplex transmission from/to the base station is possible.

An MSG may be configured to contain only a single slot, or there may be only a single MSG, e.g., the MSG comprises all slots. The determination of the UL transmission parameters associated with an MCS value by the UE in a slot may then be described by not using the term "MSG" and substituting the term "slot" for it in the following exemplary procedures described in the disclosure. Instead of the term "MSG", a set of slots of a serving cell associated with a same MCS value may be referred to as "association window". The first and the second MCS value $MCS_1$ and $MCS_2$ for a multi-slot PUSCH transmission in a serving cell may then be applied by the UE to determine the associated UL transmission parameters of a multi-slot PUSCH transmission during a first time period comprising one or multiple slots of the serving cell and a second time period comprising one or multiple slots respectively. The term "MSG" is used in this disclosure for conciseness.

When an MSG comprise more than one slot, the slots of the MSG can be consecutive, or they can be non-consecutive. One or multiple MSGs may be configured for the UE by parameter n-msgList as described in the following exemplary embodiments of the disclosure. For example, a first MSG containing a normal UL slot may be configured in the UE. A second MSG containing a full-duplex slot may be configured in the UE. When an MCS value $MCS_k$ is determined by or provided to the UE for an $MSG_k$, the value $MCS_k$ is applied by the UE to determine the associated UL transmission parameters of a multi-slot PUSCH transmission for a slot in $MSG_k$. The MCS value $MCS_k$ is not applied by the UE to determine the associated UL transmission parameters of a multi-slot PUSCH transmission a slot when the slot is not part of the $MSG_k$. One or multiple MCS values $MCS_k$ may be associated with an MSG, e.g., one or more values $MCS_k$ may be determined by or provided to the UE. When an MSG is associated with multiple MCS values, the UE determines a value $MCS_k$ for the slot from the set of determined or provided MCS values associated with the MSG by selecting a value $MCS_k$ according to a suitable rule, e.g., depending on an UL transmission format, a priority level, or the order or sequence in which values are determined by or provided to the UE.

As shown in FIG. 10, a first, second and third MCS slot group, $MSG_1$, $MSG_2$ and $MSG_3$ are configured for the UE scheduled multi-slot PUSCH allocations. $MSG_1$ contains the normal UL slots, e.g., slot 8 and 9. $MSG_2$ contains a first set of full-duplex slots, e.g., slots 2 and 3. $MSG_3$ contains a third set of full-duplex slots, e.g., slots 4, 5 and 6. Slots are numbered from 0 to 9. The UE determines or is provided a first MCS value $MCS_1$ for $MSG_1$, a second MCS value $MCS_2$ for $MSG_2$ a third MCS value $MCS_3$ for $MSG_3$. Without loss of generality and to simplify, $MCS_2=MCS_3$ in the example provided by FIG. 10, but the values of $MCS_2$ and $MCS_3$ can be different. For example, the UE determines the value of $MCS_1$ from the signaled MCS index value $I_{MCS}$ provided by the scheduling DCI F0_1, e.g., $I_{MCS1}=I_{MCS}$ and the value of $MCS_2$ from the DCI signaled MCS index value $I_{MCS}$ and a relative offset value provided by the higher layer parameter mcsAndTBSmultiPUSCH, e.g., $I_{MCS2}=I_{MCS}-$mcsAndTBSmultiPUSCH. When the UE is scheduled a multi-slot PUSCH transmission, the UE determines the UL transmission parameters associated with the PUSCH transmission in the full-duplex slots 2 or 3 using $MCS_2$ where UL transmission parameters may include a modulation order, target code rate, and/or transport block size. The UE determines the UL transmission parameters associated with the PUSCH transmission in slot 4, 5 and 6 using $MCS_3$. The UE determines the UL transmission parameters associated with the PUSCH transmission in slot 8 and 9 using $MCS_1$ in the normal UL slots. The association between MCS values and a PUSCH slot in a multi-slot PUSCH allocation is by slot number. In the example shown in FIG. 10, the UE is scheduled a multi-slot PUSCH allocation in UL-DL period n−1 only in slots 3-6 and 8-9. For example, the indicated row index of the TDRA information field in the scheduling DCI contains an configured invalid SLIV value for the fifth slot in the RRC configuration. The UE determines the MCS value for slot 3 as $MCS_2$ because the slot is associated with the configured MCS slot group $MSG_2$. Similarly, the UE determines the MCS value for slot 8 in UL-DL period n−1 as $MCS_1$ because the slot is associated with the configured MCS slot group $MSG_1$. In UL-DL period n+1, the UE would not use the MCS value $MCS_1$, because none of the normal UL slots 8-9 configured in $MSG_1$ are scheduled by the TDRA of the multi-slot PUSCH allocation in that UL-DL period, e.g., the UE would use MCS value $MCS_2=MCS_3$ to determine the UL transmission parameters for slots 2-4.

A UE may be provided by higher layers with an association between slots in a multi-slot PUSCH allocation and the MCS slot groups to determine which MCS value $MCS_k$ is selected to determine the UL transmission parameters such as modulation order, target code rate and/or TB size in a slot. The parameter n-msgList may include one or more of the following, slot(s) in a TSG and associated timer or counter or priority value(s). The parameter n-msgList may be provided by RRC signaling messages and IEs. For example, and without loss of generality, parameter n-msgList may be signaled from the gNB to the UE as part of RRC signaling messages of type RRCSetup, RRCReconfiguration, SIB1 or SystemInformation and may be included in RRC IEs of type ServingCellConfig, ServingCellConfigCommon, or ServingCellConfigSIB1. These configuration parameters may be of enumerated, listed or sequence type and/or may be encoded as a bit string.

For example, a configuration for n-msgList may be provided as SEQUENCE (SIZE (1 . . . maxNrofMSGs)) OF Msg where 'Msg' is a bit string of size M. For example, M=10 or a multiple thereof. When Msg={0011000000}, the $2^{nd}$ and $3^{rd}$ slot or slot 2 and 3 in a sequence of 10 slots numbered from 0 to 9 are configured as part of the MCS slot group $MCS_2$. When Msg={0000000011}, slots 8-9 in a sequence of 10 slots are configured as part of the MCS slot group $MCS_1$, etc.

Figure 11:
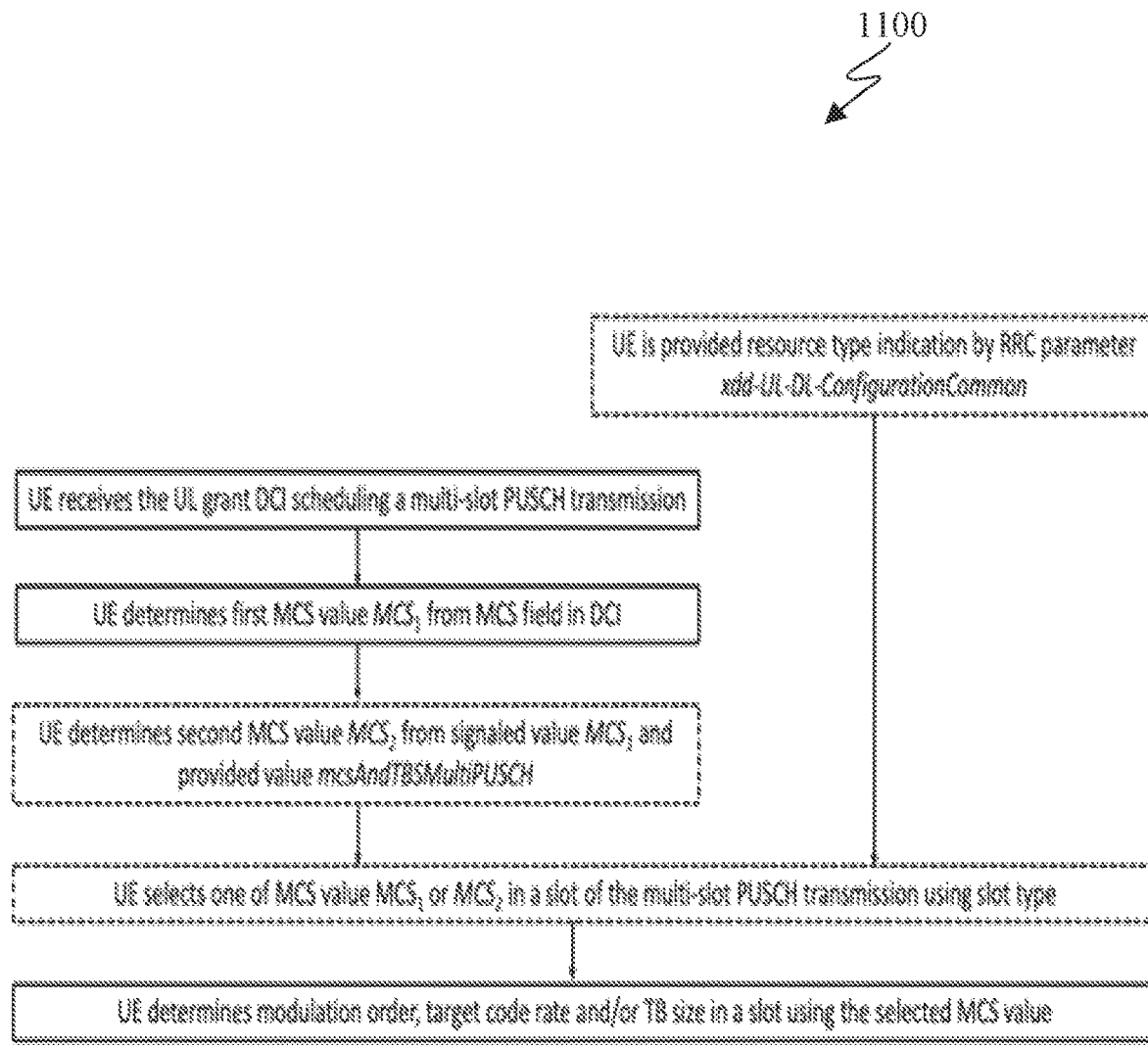
FIG. 11 illustrates UE processing steps when selecting an MCS value using slot type for a multi-slot PUSCH allocation according to the embodiments of the disclosure.

FIG. 11 illustrates UE processing steps when selecting an MCS value using slot type for a multi-slot PUSCH allocation 1100 according to the embodiments of the disclosure. The embodiment of the UE processing steps when selecting an MCS value using slot type for a multi-slot PUSCH allocation 1100 illustrated in FIG. 11 is for illustration only. FIG. 11 does not limit the scope of this disclosure to any particular implementation of the UE processing steps when selecting an MCS value using slot type for a multi-slot PUSCH allocation 1100.

In one embodiment, the UE selects an MCS value associated with UL transmission in a slot by determining a slot type when scheduled a multi-slot PUSCH transmission.

When the UE receives an UL grant DCI with a multi-slot PUSCH allocation, the UE determines a slot type for a slot part of a multi-slot PUSCH transmission and selects an MCS value $MCS_k$ to determine the UL transmission parameters for the PUSCH in that slot using the determined slot type. The slot type may include one or a combination of the following, slot and/or symbol types of type D (Downlink), U (Uplink) or F (Flexible) in a TDD common or dedicated UL-DL frame configuration or provided through SFI such as in DCI F2_0;

slot and/or symbol types of type 'simultaneous Tx-Rx', 'Rx only', or 'Tx only', e.g., associated with a TDD common or dedicated slot and/or symbol configuration providing a resource type indication; and slot and/or symbol types of subband full duplex (SBFD) or non-SBFD.

In one example, the UE selects an MCS value $MCS_k$ to determine the UL transmission parameters of a PUSCH in a slot part of the multi-slot PUSCH allocation using the higher layer provided TDD UL-DL frame configuration in tdd-UL-DL-ConfigurationCommon and/or tdd-UL-DL-ConfigurationDedicated. The UE determines the TDD UL-DL frame configuration of a serving cell by receiving a system information block (SIB), such as a SIB1, or by a common RRC signaling, or by UE-specific RRC signaling. A slot or symbol can be of type 'D', 'U' or 'F'. The UE determines a slot type for each scheduled slot in the multi-slot PUSCH allocation using the higher layer provided TDD UL-DL frame configuration. The UE does not expect to be configured an UL transmission by the DCI scheduling the multi-slot PUSCH allocation in a slot configured as type 'D'. If the determined slot type of a slot with PUSCH transmission in a multi-slot PUSCH transmission is 'U', the UE selects the first MCS value $MCS_1$. If the determined slot type of a slot with PUSCH transmission in a multi-slot PUSCH transmission is 'F', the UE selects the second MCS value $MCS_2$. A first motivation is that slots of type 'U' cannot be used by the gNB to schedule DL transmission to legacy UEs. Therefore, full-duplex transmission in the DL direction of such a slot is only possible to newer UEs with support for full-duplex transmissions in the serving cell by the gNB. Therefore, requiring a different MCS setting for the transmitting UE in the UL-only slot has limited usefulness. A second motivation is that for interference protection in the network, use of flexible slots for purpose of full-duplex scheduling by the gNB is generally preferred, e.g., UL slots are reserved and assumed to be always and exclusively available for UL scheduling to guarantee UL access to any type of UE. After the selection of an MCS value $MCS_k$ by the UE for a slot with PUSCH transmission resulting from the multi-slot PUSCH allocation, the selected value $MCS_k$ is applied by the UE to determine the associated UL transmission parameters of a multi-slot PUSCH transmission in that slot.

In another example, the UE selects an MCS value $MCS_k$ to determine the UL transmission parameters of a PUSCH in a slot part of the multi-slot PUSCH allocation using a higher layer provided resource type configuration in xdd-UL-DL-ConfigurationCommon and/or xdd-UL-DL-Configuration-Dedicated. The UE determines the resource type configuration of a serving cell by receiving a system information block (SIB), such as a SIB1, or by a common RRC signaling, or by UE-specific RRC signaling. For example, the resource type indication provided to the UE by higher layers indicates for a slot or symbol or symbol group if the transmission resource is of type 'simultaneous Tx-Rx', 'Rx only', or 'Tx only'. For example, a transmission resource of type 'simultaneous Tx-Rx', 'Rx only', or 'Tx only' can be provided per slot type 'D', 'U' or 'F' in a slot. Or the indication of the resource type may be provided independent of the transmission direction of a slot or symbol indicated to the UE by the TDD UL-DL frame configuration provided by higher layers. The UE determines a resource type for each scheduled slot in the multi-slot PUSCH allocation using the higher layer provided resource type configuration. The UE does not expect to be configured an UL transmission by the DCI scheduling the multi-slot PUSCH allocation in a slot configured as type 'Rx only'. If the determined slot type of a slot with PUSCH transmission in a multi-slot PUSCH transmission is 'Tx only', the UE selects the first MCS value $MCS_1$. If the determined slot type of a slot with PUSCH transmission in a multi-slot PUSCH transmission is 'simultaneous Tx-Rx', the UE selects the second MCS value $MCS_2$. A motivation is that configuring a slot as type 'Tx-only' versus 'simultaneous Tx-Rx', the UE may distinguish between slots in which it may assume only UL transmissions occur versus slots in which it cannot make any assumption of the DL and/or UL scheduling decisions in the gNB. Accordingly, the UE should select and use the more conservative MCS value $MCS_2$ for the full-duplex slot. After the selection of an MCS value $MCS_k$ by the UE for a slot with PUSCH transmission scheduled as by the multi-slot PUSCH allocation, the selected value $MCS_k$ is applied by the UE to determine the associated UL transmission parameters of a multi-slot PUSCH transmission in that slot. FIG. 12 shows the corresponding UE processing steps.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method for transmitting a physical uplink shared channel (PUSCH) associated with a multi-slot PUSCH transmission procedure, the method comprising:
  receiving:
    first information for a first modulation and coding scheme (MCS) indication associated with a first subset of slots from a set of slots on a cell,
    second information for a second MCS indication associated with a second subset of slots from the set of slots on the cell, and
    third information for a condition;
  determining whether the condition is valid for transmission in a slot from the second subset of slots; and
  transmitting the PUSCH in a slot associated with the multi-slot PUSCH transmission procedure based on:
    the first MCS indication when the condition is valid, and
    the second MCS indication when the condition is not valid.

2. The method of claim 1, wherein:
  a slot from the first subset of slots is not indicated for simultaneous transmission and reception during a same time-domain resource on the cell, and
  a slot from the second subset of slots is indicated for simultaneous transmission and reception during a same time-domain resource on the cell.

3. The method of claim 1, wherein the first or second information is associated with an index value to determine a value for the first or second modulation and coding scheme indications, respectively.

4. The method of claim 1, wherein the first and second information are received using one of downlink control information (DCI), a media access control-control element (MAC CE), or radio resource control (RRC) signaling.

5. The method of claim 1, wherein:
  the condition is based on one of:
    a slot or symbol number, or
    a slot or symbol type, and
  the condition is valid when:
    the slot or symbol number is comprised in the first subset of slots,
    the slot or symbol number is not comprised in the first subset of slots,
    the slot or symbol type is one of a downlink (DL) type, a flexible (F) type, or an uplink (UL) type, or
    the slot or symbol type is one of subband full duplex (SBFD) or non-SBFD.

6. The method of claim 1, further comprising:
  determining a value for the second MCS indication for a second slot from the second subset of slots based on the second MCS indication received in the second information; and using the first MCS indication for a first slot from the first subset of slots.

7. The method of claim 1, further comprising determining a value for the second MCS indication for a second slot from the second subset of slots based on a slot number and the second information, wherein the second information includes a list of MCS indications.

8. A user equipment (UE) comprising:
a transceiver configured to receive:
first information for a first modulation and coding scheme (MCS) indication associated with a first subset of slots from a set of slots on a cell,
second information for a second MCS indication associated with a second subset of slots from the set of slots on the cell, and
third information for a condition; and
a processor operably coupled with the transceiver, the processor configured to determine whether the condition is valid for transmission in a slot from the second subset of slots,
wherein the transceiver is further configured to transmit a physical uplink shared channel (PUSCH) in a slot associated with a multi-slot PUSCH transmission procedure based on:
the first MCS indication when the condition is valid, and
the second MCS indication when the condition is not valid.

9. The UE of claim 8, wherein:
a slot from the first subset of slots is not indicated for simultaneous transmission and reception during a same time-domain resource on the cell, and
a slot from the second subset of slots is indicated for simultaneous transmission and reception during a same time-domain resource on the cell.

10. The UE of claim 8, wherein the first or second information is associated with an index value to determine a value for the first or second modulation and coding scheme indications, respectively.

11. The UE of claim 8, wherein the first and second information are received using one of downlink control information (DCI), a media access control-control element (MAC CE), or radio resource control (RRC) signaling.

12. The UE of claim 8, wherein:
the condition is based on one of:
a slot or symbol number, or
a slot or symbol type, and
the condition is valid when:
the slot or symbol number is comprised in the first subset of slots,
the slot or symbol number is not comprised in the first subset of slots,
the slot or symbol type is one of a downlink (DL) type, a flexible (F) type, or an uplink (UL) type, or
the slot or symbol type is one of subband full duplex (SBFD) or non-SBFD.

13. The UE of claim 8, wherein the processor is further configured to:
determine a value for the second MCS indication for a second slot from the second subset of slots based on the second MCS indication received in the second information; and use the first MCS indication for a first slot from the first subset of slots.

14. The UE of claim 8, wherein the processor is further configured to determine a value for the second MCS indication for a second slot from the second subset of slots based on a slot number and the second information and wherein the second information includes a list of MCS indications.

15. A base station (BS) comprising:
a transceiver configured to transmit:
first information for a first modulation and coding scheme (MCS) indication associated with a first subset of slots from a set of slots on a cell,
second information for a second MCS indication associated with a second subset of slots from the set of slots on the cell, and
third information for a condition; and
a processor operably coupled with the transceiver, the processor configured to determine whether the condition is valid for transmission in a slot from the second subset of slots,
wherein the transceiver is further configured to receive a physical uplink shared channel (PUSCH) in a slot associated with a multi-slot PUSCH transmission procedure based on:
the first MCS indication when the condition is valid, and
the second MCS indication when the condition is not valid.

16. The BS of claim 15, wherein:
a slot from the first subset of slots is not indicated for simultaneous transmission and reception during a same time-domain resource on the cell, and
a slot from the second subset of slots is indicated for simultaneous transmission and reception during a same time-domain resource on the cell.

17. The BS of claim 15, wherein the first or second information is associated with an index value to determine a value for the first or second modulation and coding scheme indications, respectively.

18. The BS of claim 15, wherein the first and second information are received using one of downlink control information (DCI), a media access control-control element (MAC CE), or radio resource control (RRC) signaling.

19. The BS of claim 15, wherein:
the condition is based on one of:
a slot or symbol number, or
a slot or symbol type, and
the condition is valid when:
the slot or symbol number is comprised in the first subset of slots,
the slot or symbol number is not comprised in the first subset of slots,
the slot or symbol type is one of a downlink (DL) type, a flexible (F) type, or an uplink (UL) type, or
the slot or symbol type is one of subband full duplex (SBFD) or non-SBFD.

20. The BS of claim 15, wherein the processor is further configured to determine a value for the second MCS indication for a second slot from the second subset of slots based on a slot number and the second information and wherein the second information includes a list of MCS indications.

* * * * *